US006358602B1

(12) United States Patent
Horiuchi et al.

(10) Patent No.: US 6,358,602 B1
(45) Date of Patent: *Mar. 19, 2002

(54) MODIFIED INK PARTICLE, MANUFACTURING METHOD THEREOF, COLOR FILTERS, MANUFACTURING METHOD THEREOF, COLOR DISPLAYS, AND MANUFACTURING DEVICES FOR MODIFIED INK PARTICLE

(75) Inventors: Takahiro Horiuchi, Nara; Kiyofumi Morimoto, Yamatokoriyama; Tadanori Hishida, Kashihara, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,050

(22) Filed: Jun. 4, 1999

(30) Foreign Application Priority Data

Jun. 5, 1998 (JP) .......................................... 10-157991

(51) Int. Cl.[7] .................................................. B32B 5/16

(52) U.S. Cl. ...................... 428/323; 428/357; 428/403; 428/426

(58) Field of Search ................................ 428/403, 402, 428/357, 411.1, 426, 323, 331

(56) References Cited

U.S. PATENT DOCUMENTS 4,113,641 A * 9/1978 Brana et al. ............ 252/62.1 P
4,818,614 A * 4/1989 Fukui et al. ................ 428/403
5,653,794 A * 8/1997 Weber et al. ............... 106/442
6,051,060 A * 4/2000 Mizobuchi .................. 106/499
6,094,247 A * 7/2000 Miyazaki et al. ........... 349/110

FOREIGN PATENT DOCUMENTS

EP 733682 A1 9/1996
EP 0735401 A 10/1996
JP 52-2865 1/1977
JP 63 235901 A 9/1988
JP 7-225308 8/1995

* cited by examiner

*Primary Examiner*—Blaine Copenheaver
*Assistant Examiner*—Christopher Paulraj
(74) *Attorney, Agent, or Firm*—David G. Conlin; John B. Alexander

(57) ABSTRACT

The modified ink particle includes a main body; and a modified portion formed from a modifier on at least a part of a surface of the main body of the ink particle by vapor-depositing the vaporized modifier on the surface of the floating main body. With the arrangement, modified ink particles that have relatively small and homogeneous particle diameters and are suitable for color filters can be manufactured without charging the particles, by means of a simple device and operation, in a short time, and at low costs.

6 Claims, 19 Drawing Sheets

F I G. 1 2
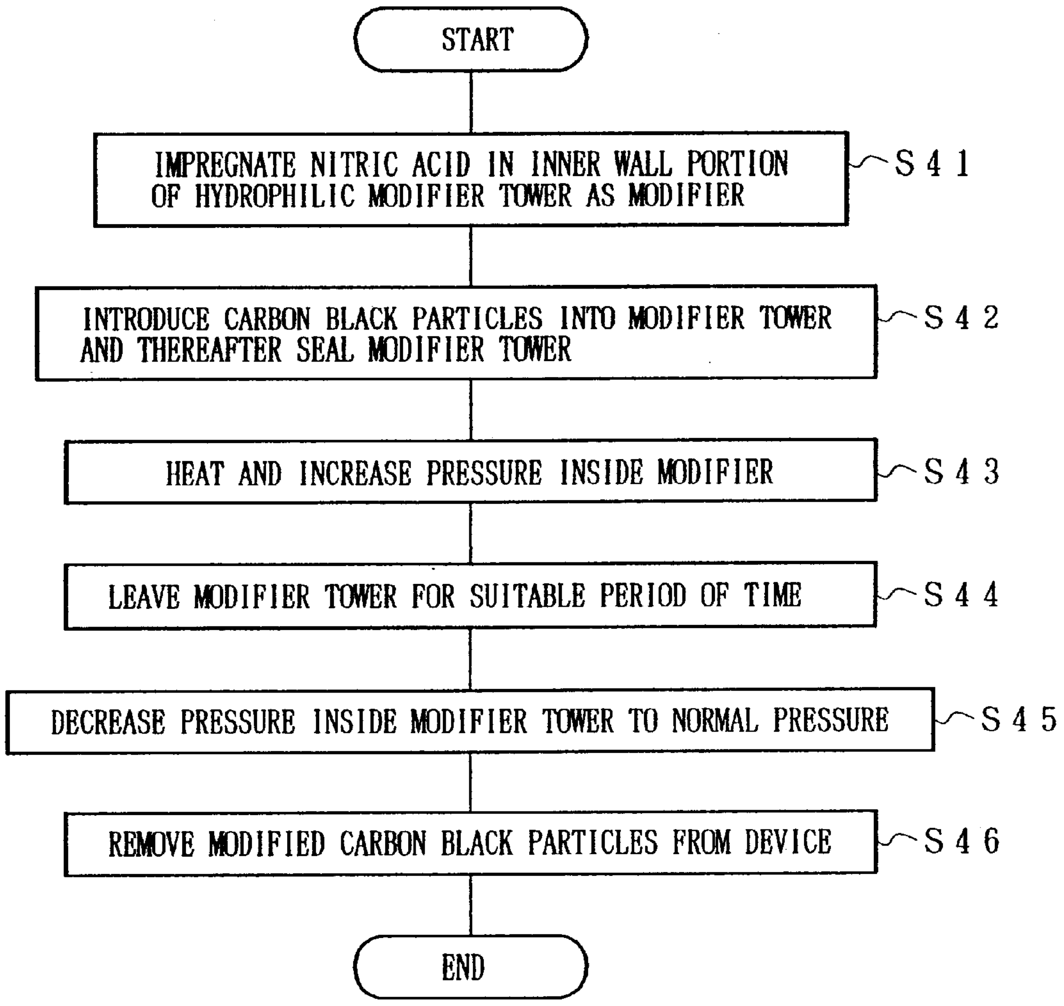

MODIFIED INK PARTICLE, MANUFACTURING METHOD THEREOF, COLOR FILTERS, MANUFACTURING METHOD THEREOF, COLOR DISPLAYS, AND MANUFACTURING DEVICES FOR MODIFIED INK PARTICLE

FIELD OF THE INVENTION

The present invention relates to modified ink particles used for a colour liquid crystal display for a colour television, personal computer, or other apparatuses and a manufacturing method thereof, a colour filter incorporating the modified ink particles and a manufacturing method thereof, a colour display such as liquid crystal panels incorporating such a colour filter, and a manufacturing device of the modified ink particles.

BACKGROUND OF THE INVENTION

In recent years, we have observed a growing demand for liquid crystal displays, especially, colour liquid crystal displays as a result of technological advances in the personal computer field, especially, in the portable personal computer field.

However, the liquid crystal display, especially, the colour liquid crystal display is still expensive, and a cutdown in the cost is unavoidable for a widespread use thereof. Particularly, a cutdown in the cost of colour filters to enable colour display is essential.

Conventional manufacturing methods of colour filters are approximately categorised into the following four methods.

The first method adopts a dyeing technique. According to the technique, a base material layer for dyeing is formed from water-soluble polymer materials on a glass substrate, and processed into a desired shape with a photolithographic technique, and the obtained base material layer is soaked in a dyeing agent to become dyed. The soaking operation is repeated thrice for the red (R), green (G), and blue (B) colours to form an RGB colour filter layer.

The second method adopts a pigment dispersion technique. According to the technique, a photosensitive resin layer in which a pigment is dispersed is formed, and processed into a desired pattern. The operation is repeated thrice for R, G, and B to form an RGB colour filter layer.

The third method adopts an electrodeposition technique. According to the technique, a translucent conductive film is formed on a substrate, processed into a desired pattern, and undergoes an electrodeposition in an electrodeposition coating liquid containing a pigment, a resin, and an electrolyte to form a monochromatic filter. The operation is repeated thrice for R, G, and B to form an RGB colour filter layer.

The fourth method adopts a printing technique. According to the technique, a thermosetting type resin in which a pigment is dispersed is printed. The operation is repeated thrice for R, G, and B to form an RGB colour filter layer.

These methods require the same operation to be repeated thrice to form a trichromatic RGB filter layer, adding to the cost. In addition, the printing technique does not produce a high resolution, and therefore is not suitable to form a pattern including highly fine pitches.

To make up the deficiencies, Japanese Laid-Open Patent Application No. 7-225308/1995 (Tokukaihei 7-225308) discloses a manufacturing method of a colour filter adopting an ink jet recording device (printer).

According to the manufacturing method, a curable resin layer containing methylol urea is formed on a substrate such as a glass substrate provided thereon with a lattice-like black matrix section. Subsequently, the resin layer corresponding to an empty space that is in a grid of the black matrix section is dyed by spraying solid inks of the respective RGB colours with an ink jet recording technique. The dyed resin layer is then caused to cure. Hence the method successfully forms a trichromatic RGB filter layer in a single operation, allowing a cut-down in the cost.

Nevertheless, the mutual wettability within the colour filter layer described in the aforementioned Patent Application is not satisfactory between the substrate and the resin layer and between the resin layer and the solid ink. Therefore, there occurs a problem of repelling between the layers, i.e., peeling of the layers at least at a segment of the interface therebetween, causing pin holes and other deficiencies in the colour filter layer.

In addition, regarding with the colour filter layer described in the aforementioned Patent Application, since the black matrix section is embedded in the colour filter layer, the height of the black matrix section is different from that of the colour filter layer, hampering the formation of a uniform surface on the black matrix section and the colour filter layer. Therefore, when such a colour filter is adopted in a colour display such as a liquid crystal panel, diffraction and refraction due to the non-uniform surface is likely to cause undesirable mixture of colour, and degrading colour display quality.

In addition, since the colour filter layer is formed by dispersing ink in a resin layer, the boundaries between the RGB colours are blurred. It is therefore necessary to provide a non-colouring section between adjoining RGB colouring sections to separate those colouring sections in the colour filter layer, which adds to skills and techniques required in the fabrication of the colour filter layer.

SUMMARY OF THE INVENTION

An object of the present invention is to offer modified ink particles that satisfy conventionally required properties in terms of heat resistance, solvent resistance, and resolution, as well as ink jet characteristics, that restrain occurrences of pin holes and other deficiencies, and that are readily fabricated into a colour filter; a manufacturing method thereof; a colour filter incorporating the modified ink particles; a colour display such as a liquid crystal panel using the colour filter; and a manufacturing device of the modified ink particles.

In order to achieve the object, a modified ink particle in accordance with the present invention, includes:

- a main body; and
- a modified portion formed from a modifier on at least a part of a surface of the main body by vapour-depositing the vapourised modifier on the surface of the main body that is floating.

In the modified ink particle as set forth above, when the main body is hydrophobic, the modified portion is preferably hydrophilic. Further, in the modified ink particle as set forth above, when the main body is hydrophilic, the modified portion is preferably hydrophobic.

With the aforementioned arrangement, it is possible to impart both hydrophobic and hydrophilic properties to the modified ink particle: for example, when the main body of the ink particle has hydrophobic properties, the modified portion thereof has hydrophilic properties; when the main body of the ink particle has hydrophilic properties, the modified portion thereof has hydrophobic properties.

For these reasons, with the aforementioned arrangement, when the modified ink particle is used in a colour filter layer or a black matrix layer which is formed, for example, on a substrate of a liquid crystal panel or on a resin layer formed on that substrate, regardless of whether the substrate or the resin layer on the substrate is hydrophilic or hydrophobic, the modified ink particle shows improved affinity with the substrate and the resin layer due to its dual properties. Moreover, the modified ink particle shows improved affinity with, for example, the individual RGB colour filter layers and the black matrix layer that are provided adjacent to each other in the colour filter layer.

Therefore, the aforementioned arrangement restrains occurrences of deficiencies of conventional technique: for example, poor mutual wettability, mutual repelling, peeling at least at a part of the interfaces, and a high likelihood of pin holes in the colour filter layer.

In order to achieve the object, a manufacturing method of a modified ink particle in accordance with the present invention, includes the steps of:

(a) floating a main body of an ink particle;

(b) mixing the floating main body of the ink particle with a vapourised modifier; and (c) vapour-depositing the vapourised modifier on a surface of the main body of the ink particle to form a modified portion formed from the modifier on the surface of the main body of the ink particle.

With the method as set forth above, the vapourised modifier may be vapour-deposited by turning the vapourised modifier into an oversaturation state by means of adiabatic expansion. Moreover, with the method as set forth above, the vapourised modifier may be vapour-deposited by turning the vapourised modifier into an oversaturation state by means of cooling. Furthermore, with the method as set forth above, the vapourised modifier may be vapour-deposited by turning the vapourised modifier into an oversaturation state by means of mixing the vapourised modifier with the main body of the ink particle that is cooler than the vapourised modifier.

With these method, the vapourised modifier can be distributed in a substantially uniform manner around the main body of the ink particle. Therefore, if such vapourised modifier is vapour-deposited, for example, in an oversaturation state, the vapourised modifier can be uniformly vapour-deposited on the surface of the main body of the ink particle.

Therefore, with the method, since the surface of the fine main body of the ink particle can be modified with a modifier that can be more surely supplied to the surface, the modified portion can be formed only on the surface of a fine main body of the ink particle, the amount of the modifier used can be reduced, the formation of the modified portion can be stabilised.

As a result, with the method, it becomes possible to more surely manufacture a fine modified ink particle having a more uniform modified portion.

In order to achieve the object, a colour filter in accordance with the present invention has a water repellent resin layer on a plastic substrate and a colouring section formed from the modified ink particle on the water repellent resin layer. Another colour filter in accordance with the present invention has a hydrophilic resin layer on a glass substrate and a colouring section formed from the modified ink particle on the hydrophilic resin layer. The colouring section may be, for example, a colour filter layer or a black matrix layer.

With the arrangement as set forth above, it is possible to impart both hydrophobic and hydrophilic properties to the modified ink particle: for example, when the main body of the ink particle has hydrophobic properties, the modified portion thereof has hydrophilic properties; when the main body of the ink particle has hydrophilic properties, the modified portion thereof has hydrophobic properties. For these reasons, with the arrangement, when the modified ink particle is used in a colour filter layer or a black matrix layer which is formed, for example, on a substrate of a liquid crystal panel or on a resin layer formed on that substrate, regardless of whether the substrate or the resin layer on the substrate is hydrophilic or hydrophobic, the modified ink particle shows improved affinity with the substrate and the resin layer due to its dual properties. Moreover, the modified ink particle shows improved affinity with, for example, the individual RGB colour filter layers and the black matrix layer that are provided adjacent to each other in the colour filter layer in a similar manner.

Therefore, the aforementioned arrangement restrains occurrences of deficiencies of conventional technique: for example, poor mutual wettability, mutual repelling, peeling at least at a part of the interfaces, and a high likelihood of pin holes in the colour filter layer. Consequently, the colour filter in accordance with the present invention shows an improved yield.

In order to achieve the object, a manufacturing method of a colour filter in accordance with the present invention is a manufacturing method of the aforementioned colour filter, and includes the step of forming the colouring section of the modified ink particle with an ink jet technique using the modified ink particle.

With the method as set forth above, the modification allows, for example, the colour filter layers each having a colouring section of one of the three colours to be concurrently formed from a plurality of modified ink particles, for example, on a substrate or on a resin layer on that substrate, using an ink jet technique for the modified ink particles, so that the colour filter layers, as well as the black matrix layer, form a common flush surface. Therefore, with this method, the manufacturing process of the colour filter is less complex and produces a colour filter having better optical properties than conventional techniques.

In other words, with the method as set forth above, it is possible to modify hydrophobic carbon black by oxidisation using, for example, nitric acid, and to use, as a modified ink particle for a black matrix, the carbon black having a modified surface to which hydrophilic properties developing from, for example, a carboxyl group formed by oxidisation are imparted. Moreover, with the method, a hydrophilic colour particle for use with the colour filter can be modified with paraffin or other hydrophobic substances, and modified colour particles to which hydrophobic properties are imparted can also be used as RGB modified ink particles.

Hence, the surface of the individual modified ink particle is modified and have better physical properties. Therefore, even if the ink particles are adjacent to each other or to a resin layer provided on the substrate, i.e., the occurrences of pin holes and other deficiencies, is restrained based on repelling resulting from poor mutual wettability, it becomes possible to form the modified ink particles adjacent to each other.

Hence, even if the colouring sections of colour filters, such as the black colouring section of a black matrix layer and the RGB colouring sections, are concurrently formed from the modified ink particles radjacent to each other, using an ink jet technique for the modified ink particles, so that the colouring sections form a common flush surface, occurrences of pin holes and other deficiencies, which were highly likely to occur with conventional techniques in the interface, are restrained. Moreover, with this method, since the colouring sections can be concurrently formed to form a common flush surface, light diffraction and refraction can be reduced with the obtained colour filter due to the common flush surface. Consequently, with the method, a colour filter with restrained occurrences of deficiencies and diffraction and greatly improved optical properties becomes readily available in a stable manner.

In order to achieve the object, a colour display device in accordance with the present invention includes the aforementioned colour filter. With the arrangement as set forth above, since the colour filter can be made to develop a less likelihood of pin holes and other deficiencies and to have colouring sections having a common flush surface, poor display due to light diffraction or refraction and other conventional deficiencies can be restrained and the yield is improved, which in turn improves the quality in colour display, and makes it possible to cut costs.

In order to achieve the object, a manufacturing device of a modified ink particle in accordance with the present invention includes:

a modification operating section having inside thereof a sealable processing space;

a particle introduction port for introducing a main body of an ink particle into the processing space;

a particle exhaust outlet for removing a modified ink particle of which at least a surface is modified by a modifier from the processing space; and control means for mixing the main body of the ink particle that has been introduced through the particle introduction port and that is floating with the vapourised modifier in the processing space, turning the vapourised modifier into an oversaturation state by means of temperature control or pressure control of the processing space, vapour-depositing the vapourised modifier on a surface of the main body of the ink particle, forming a modified portion formed from the modifier on the surface of the main body of the ink particle, and removing the modified ink particle through the particle exhaust outlet.

With the arrangement as set forth above, the provision of the control means enables the aforementioned modified ink particles having good properties to be obtained in a stable manner.

Additional objects, advantages and novel features of the invention will be set forth in part in the description which follows, and in part will become apparent to those skilled in the art upon examination of the following or may be learned by practice of the invention. The objects and advantages of the invention may be realised and attained by means of the instrumentalities and combinations particularly pointed out in the appended claims.

BRIEF DESCRIPTION OF THE DRAWINGS

FIG. 1(*b*) is a schematic view of a modified ink particle in accordance with the present invention, showing an ink particle constituted by a hydrophobic main body and a hydrophilic modified portion.

FIG. 12 is a flow chart for a manufacturing method of the modified ink particles of the third embodiment in accordance with the present invention.

DESCRIPTION OF THE EMBODIMENTS

Embodiment 1

The modified ink particle of the first embodiment in accordance with the present invention is constituted by a main body and a modified portion formed from a modifier at least on a part of the surface of the main body of the ink particle by vapour-depositing the vapourised modifier on the surface of the main body of the ink particle floating in a gaseous phase.

Figure 1:
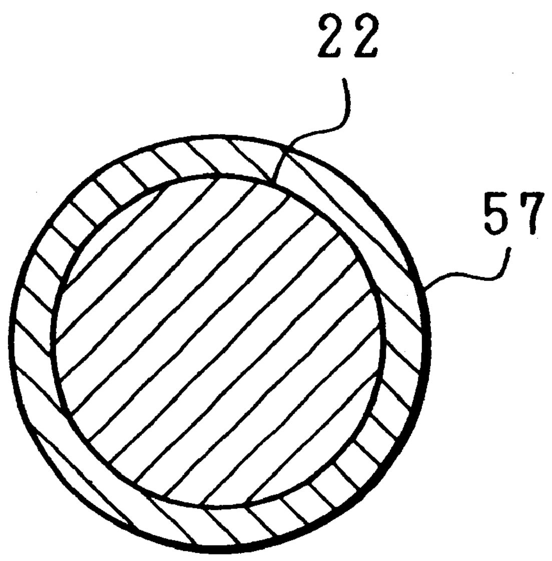
FIG. 1(*a*) is a schematic cross-sectional view of a modified ink particle in accordance with the present invention, showing an ink particle constituted by a hydrophilic main body and a hydrophobic modified portion.
Figure 1:
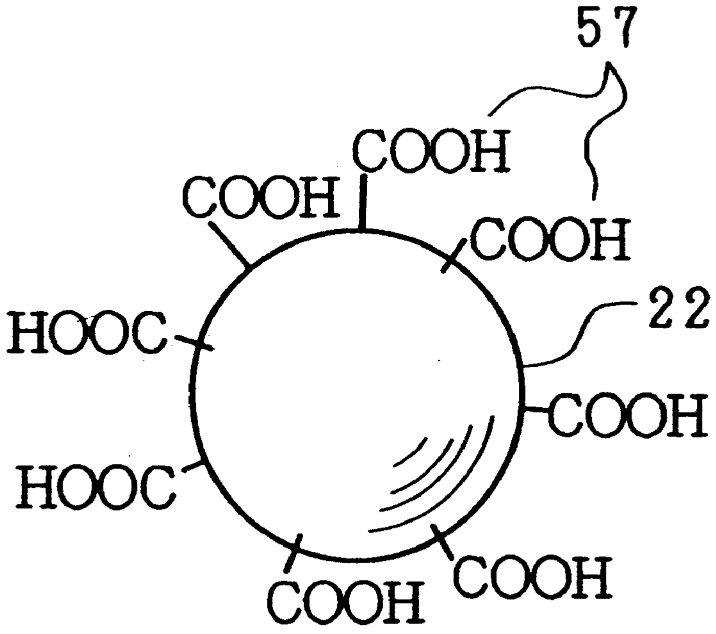

In the modified ink particle, if the main body 22 of the ink particle is hydrophilic like a colour particle for a colour filter of a liquid crystal panel as shown in FIG. 1(*a*), the modified portion 57 of the ink particle is preferably hydrophobic. Moreover, in the modified ink particle, if the main body 22 of the ink particle is hydrophobic like carbon black for a black matrix as shown in FIG. 1(*b*), the modified portion 57 of the ink particle is preferably hydrophilic, for example, due to a carboxylic group formed by oxidation by nitric acid.

The aforementioned colour particle is formed from, for example, a multifunctional acrylic resin as a monomer, an acrylic acid copolymer as a binder, a triazole as an initiator, and a pigment as a colouring agent. The aforementioned pigment is, for example, a dianthraquinones pigment for red (R), a halogenized phthalocyanines pigment for green (G), and a phthalocyanines pigment for blue (B).

The aforementioned modifier may be selected appropriately according to the characteristics that are to be imparted, the kinds of the modifier and particles, etc., and preferably has a boiling point higher than room temperature (20° C.) and not higher than 300° C., more preferably not lower than 30° C. and not higher than 200° C., and even more preferably not lower than 40° C. and not higher than 100° C., since such modifiers are easy to handle and readily produce saturated vapour. The modifier for imparting hydrophilic properties is, for example, a strong acid that is liquid at room temperature, such as nitric acid, sulfuric acid, or chlorosulfonic acid. The modifier for imparting hydrophobic properties is, for example, a hydrocarbon, such as olefin (polyolefin wax) or paraffin.

A manufacturing method of the modified ink particles in accordance with the present invention includes the steps of (a) floating the main body of the ink particle, (b) mixing the floating main body of the ink particle with the vapourised modifier, and (c) forming the modified portion formed from the aforementioned modifier on the surface of the main body of the ink particle by vapour-depositing the vapourised modifier on the surface of the main body of the ink particle.

Preferably, the above-mentioned vapour deposition of the vapourised modifier is done by turning a vapourised modifier or desirably a saturated, vapourised modifier into an oversaturation state by means of pressure control and/or temperature control so that the oversaturated, vapourised modifier is vapour-deposited onto each floating main body of the ink particle.

The aforementioned temperature control is done, for example, by cooling a mixture of the floating main body of the ink particle with the vapourised modifier, or by floating the main body of the ink particle that has a lower temperature than the vapourised modifier or preferably that is deliberately cooled, in the vapourised modifier or preferably in the saturated, vapourised modifier so that the main body comes into contact with the vapourised modifier. The aforementioned pressure control is preferably done by adiabatic expansion such that the pressure is lowered from a pressurised state to, for example, a normal pressure state.

The particle diameter of the floating main body of the ink particle is not limited in any special manner as long as the main body can float in a gaseous phase, and may be specified according to the desired particle diameter of the modified ink particle. Preferably, the particle diameter is in a range of 0.01 $\mu$m to 100 $\mu$m, more preferably, in a range of 0.1 $\mu$m to 10 $\mu$m. The shape of the aforementioned main body of the ink particle is preferably spherical, but may be arbitrary (irregular).

The particle diameter of the modified ink particle may be arbitrarily specified, but is preferably in a range of 0.01 $\mu$m to 20 $\mu$m, and more preferably in a range of 0.01 $\mu$m to 5 $\mu$m. The shape of the modified ink particle is preferably spherical, but may be arbitrary.

The technique to introduce the main body of the ink particle in a processing space filled with the vapourised modifier (preferably saturated, vapour modifier) is not limited in any special manner, but conveniently performed by blowing the main body of the ink particle into the processing space together with an inert gas that acts as a carrier for the aforementioned main body of the ink particle. That is, the manufacturing method in accordance with the present invention can bring the main body of the ink particle into contact with the vapour in the presence of the inert gas.

The inert gas is, specifically, for example, nitrogen gas, helium gas, or argon gas. However, the inert gas is not limited in any particular manner, and may be any gas that is inert to the main body of the ink particle and the vapourised modifier that are used for the manufacturing method in accordance with the present invention, as well as to the obtained modified ink particle.

The modified ink particle obtained with the aforementioned method is collected and, if necessary, thereafter washed with extrapure water or other substances. Hence, the modified ink particle can be manufactured with the non-pure substance (contaminant) removed therefrom. The water-washed modified ink particle may be dried, if necessary, to a degree such that the modified ink particles do not aggregate. Whether or not the non-pure substances contained in the modified ink particle have been successfully removed is judged, for example, based on the pH value of the washing liquid. The collecting method, water-washing method, and drying method of the modified ink particles are not limited in any particular manner.

Figure 2:
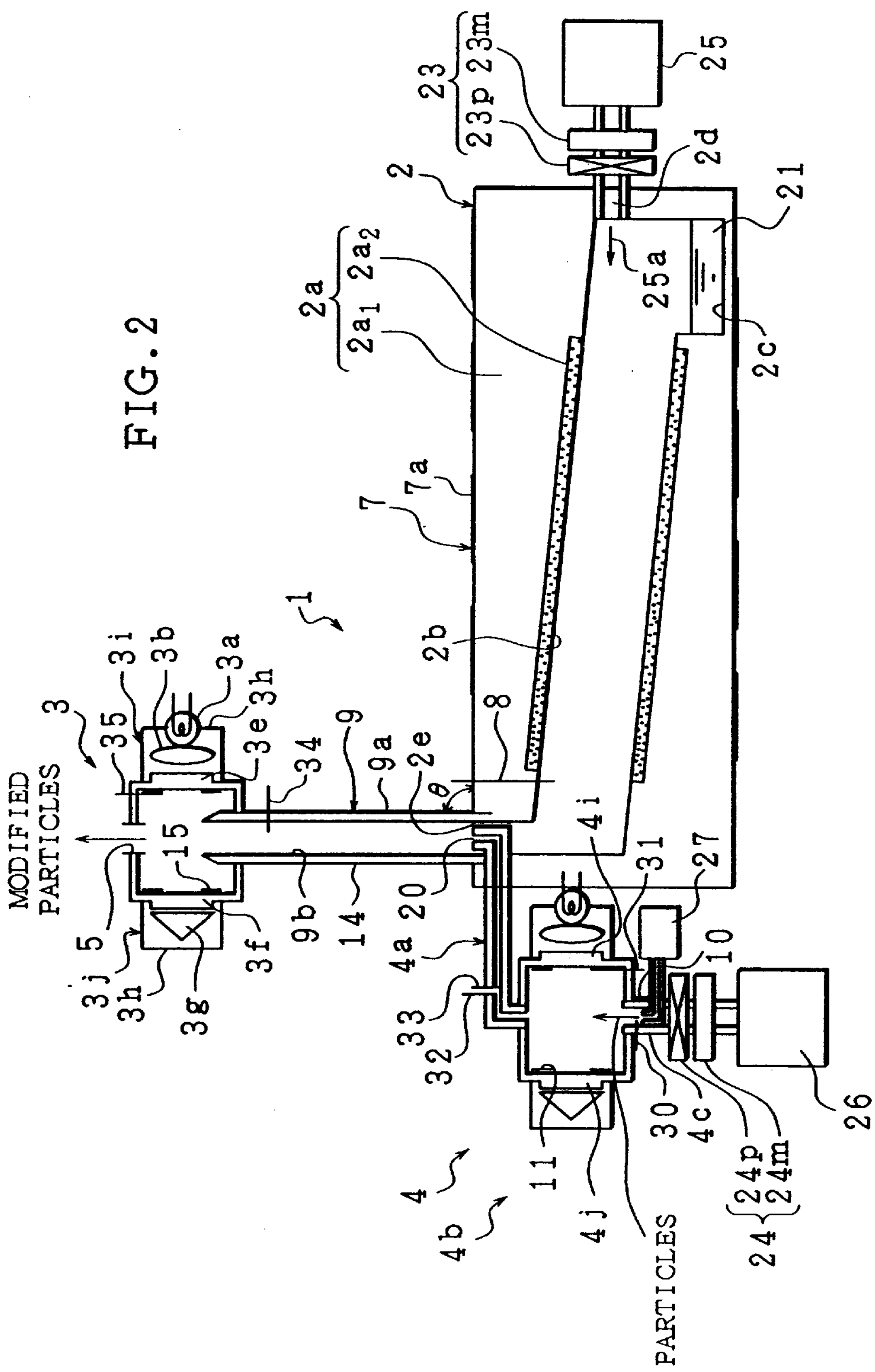
FIG. 2 is a cross-sectional view schematically showing the arrangement of a manufacturing device for modified ink particles of a first embodiment in accordance with the present invention.

Referring to FIG. 2, the following description will explain an example of the manufacturing device suitably used to manufacture the aforementioned modified ink particle.

As shown in FIG. 2, the manufacturing device 1 is provided with a vapour deposition box (modification processing section) 2, a particle introduction section 4, a heating device 7, a mixer section 9, cooling devices 10 and 13, a temperature adjusting device 14, and other members.

The vapour deposition box 2 has a vapour generating space (processing space) 2*b* that can hold vapourised modifier 21 therein. The particle introduction section 4 is for introducing the cooled main body 22 of the ink particle into the mixer section 9. The heating device 7 is for heating the inside of the vapour generating space 2*b* so as to generate saturated, vapourised modifier 21 inside the vapour deposition box 2. The mixer section 9 is for vapour-depositing the modifier 21 on the surface of the main body 22 of the ink particle by mixing the cooled main body 22 of the ink particle with the saturated, vapourised modifier 21. The cooling devices 10 and 13 are for cooling the main body 22 of the ink particle. The temperature adjusting device 14 is for adjusting the temperature of the mixer section 9.

The vapour deposition box 2 is specified to have an outer shape of a horizontally elongated column or prism, but is not limited in any particular manner. The vapour deposition box 2 has a wall portion 2*a* in which the vapour generating space 2*b* is formed along the longitudinal direction of the vapour deposition box 2. The vapour generating space 2*b* is formed, for example, as a hollow column, and inclines vertically to the central axis of the vapour deposition box 2.

On the lower end of the vapour generating space 2*b* is provided a storage section 2*c* for storing the modifier 21. The inclination causes, for example, the modifier 21 adhering to the inner wall of the vapour generating space 2*b* to flow into the storage section 2c. On one of the ends of the vapour deposition box 2 that is closer to the aforementioned storage section 2c is provided a clean gas introduction port 2d that is coupled to the empty space over the storage section 2c of the vapour generating space 2b.

A vapour outlet 2e is provided on the other end of the vapour deposition box 2, opposite to the clean gas introduction port 2d along the longitudinal direction of the vapour deposition box 2. The aforementioned vapour outlet 2e is formed to be open upward from the vapour generating space 2b so as to eject the saturated, vapourised modifier 21 generated in the vapour generating space 2b to the mixer section 9 along the direction perpendicular to the longitudinal direction of the vapour deposition box 2 (i.e., vertical direction). Moreover, the vapour outlet 2e is open toward the center of the processing space 9b of the mixer section 9 so that the saturated, vapourised modifier 21 in the vapour generating space 2b is smoothly introduced into the mixer section 9.

In the manufacturing device 1, the saturated, vapourised modifier 21 is sent to the mixer section 9 by introducing a modifier transport gas from the clean gas supply device 25 through the clean gas introduction port 2d. Note that an inert gas that is inert to the main body 22 of the ink particle as well as to the modifier 21 and that is gaseous at the temperature inside the vapour deposition box 2 can be suitably used as the modifier transport gas.

If a fine non-pure substance particle is contained as a floating particle in the modifier transport gas introduced into the vapour generating space 2b, there is a likelihood of the saturated, vapourised modifier 21 vapour-deposited on the non-pure substance particle when the saturated, vapourised modifier 21 is mixed with the cooled main body 22 of the ink particle in the mixer section 9 and hence reaches an over-saturation state.

Accordingly, the manufacturing device 1 is provided therein with the clean gas supply device 25 for supplying a clean modifier transport gas 25a, from which non-pure substance particles and non-pure substance vapours have been removed, to the vapour generating space 2b in the vapour deposition box 2. Hence, the saturated vapour in the vapour generating space 2b is prevented from being vapour-deposited on non-pure substance particles. Moreover, if a non-pure substance vapour is contained in the modifier transport gas 25a, upon vapour-depositing the saturated, vapourised modifier 21 on the surface of the main body 22 of the ink particle, the non-pure substance vapour can be prevented from being vapour-deposited together with the saturated, vapourised modifier 21 and reducing the purity of the film of the modifier 21 formed on the surface of the main body 22 of the ink particle.

The clean gas supply device 25 is coupled to the vapour deposition box 2 via non-pure substance removing device 23 for removing non-pure substances in the modifier transport gas 25a. Hence, even if a commercially available gas that is of a low purity or air is used as a source of the modifier transport gas 25a, the modifier 21 can be prevented from being vapour-deposited on floating non-pure substance particles, and vapourised non-pure substances contained in the modifier transport gas 25a can be prevented from being vapour-deposited on the main body 22 of the ink particle. The non-pure substance removing device 23 is constituted by an air filter device 23p and a mist removing device 23. Note that either one of the air filter device 23p and the mist removing device 23m can be omitted.

Moreover, the wall portion 2a of the vapour deposition box 2 is constituted by an outer wall portion 2a, that does not allow gas to flow therethrough and an inner wall portion $2a_2$. The inner wall portion $2a_2$ is not limited in any special manner, however, is preferably provided with a porous material portion formed from a porous material such as a ceramic or a felt, as shown in FIG. 2, to allow impregnation of the modifier 21 therein. In FIG. 2, the porous material portion is formed on the entire inner surface of the inner wall portion $2a_2$. However, there is an alternative: the porous portion may be formed on a part of the inner surface of the inner wall portion $2a_2$.

Hence, by using a porous material to form at least a part of the member opposing the vapour generating space 2b of the vapour deposition box 2, the modifier 21 is exposed to a heated atmosphere in the vapour deposition box 2 while being impregnated in a porous material having a large surface area. As a result, the saturated, vapourised modifier 21 can be obtained efficiently in a short period of time.

The heating device 7 is for heating the inside of the inner wall portion $2a_2$ and the vapour generating space 2b of the vapour deposition box 2. The heating device 7 has a heater 7a and a voltage converter (not shown) chiefly composed of a variable resistor such as a slidac. The heater 7a is a ribbon heater and is wound spirally around the outer surface of the outer wall portion $2a_1$ of the vapour deposition box 2. The thermometer 8 is for measuring the temperature of the inner wall portion $2a_2$ and the vapour generating space 2b, and is disposed on the wall portion 2a of the vapour deposition box 2.

The particle introduction section 4 is connected to a particle introduction port 20 that is provided to be open immediately in front of the entrance to the mixer section 9, or in other words, near the vapour outlet 2e that is located on the ejecting end of the vapour deposition box 2. Hence, the decrease in density, of the saturated, vapourised modifier 21 that is filling and flowing inside the vapour deposition box 2, caused by the deposition thereof onto the particle introduction section 4 can be restrained to a minimum extent, and the temperature interference between the vapour generating space 2b of the hot vapour deposition box 2 and the particle introduction section 4 that is cool relative to the vapour generating space 2b can be specified to a minimum extent. Note that the particle introduction port 20 is open approximately toward the centre of the processing space 9b in the mixer section 9 so that the main body 22 of the ink particle is smoothly introduced through the particle introduction section 4 to the mixer section 9.

To the particle introduction section 4, a particle transport gas for transporting the main body 22 of the ink particle to the particle introduction section 4 is supplied from a clean gas supply device 26, and the main body 22 of the ink particle is supplied from a particle supply device 27 at respectively predetermined flow rates. For example, a compressor is used to supply the main body 22 of the ink particle and the particle transport gas to the particle introduction section 4. As the particle transport gas, an inert gas is suitably used that is inert to the main body 22 of the ink particle as well as to the modifier 21, and that is gaseous at the temperature inside the particle introduction section 4.

The main body 22 of the ink particle supplied to the particle introduction section 4 is transported through the particle introduction section 4 while floating in the particle transport gas, and is cooled by the cooling devices 10 and 13 before reaching the particle introduction port 20.

Hence, transformation (including liquidation and vapourisation), deformation, and change in state of the main body 22 of the ink particle that are caused by heat can be restrained during the transport stage before the main body 22 of the ink particle is mixed with the saturated, vapourised modifier 21 in the mixer section 9. In addition, by mixing the cooled main body 22 of the ink particle with the saturated, vapourised modifier 21 in the mixer section 9, an oversaturated vapour atmosphere can be formed around the main body 22 of the ink particle.

In the particle introduction section 4, if there is contained a fine non-pure substance particle in the particle transport gas as a floating particle when the main body 22 of the ink particle is cooled by the cooling devices 10 and 13, there is a likelihood of the saturated, vapourised modifier 21 being vapour-deposited on this non-pure substance particle when the saturated, vapourised modifier 21 is mixed with the cooled main body 22 of the ink particle in the mixer section 9 and reaches an oversaturation state.

Accordingly, in the manufacturing device 1, a clean gas, from which the non-pure substance particle and the non-pure substance vapour have been removed, is introduced to the particle introduction section 4 as the particle transport gas. Hence, the saturated, vapourised modifier 21 can be prevented from being vapour-deposited on the non-pure substance particle.

Moreover, if there is contained a non-pure substance vapour in the particle transport gas, upon vapour-depositing the saturated, vapourised modifier 21 on the surface of the main body 22 of the ink particle, the non-pure substance vapour can be prevented from being vapour-deposited together with the saturated, vapourised modifier 21 and reducing the purity of the film formed from the modifier 21 on the surface of the main body 22 of the ink particle.

In the manufacturing device 1, in order to introduce, as the particle transport gas to the particle introduction section 4, a clean gas from which the non-pure substance particle and the non-pure substance vapour have been removed, a non-pure substance removing device 24 for removing the non-pure substance particle and non-pure substance vapour in the particle transport gas is interposed between the clean gas supply device 26 and the particle introduction section 4.

Hence, even if a commercially available gas that is of a low purity or air is used as the particle transport gas, the modifier 21 can be prevented from being vapour-deposited on the floating non-pure substance particle, and the non-pure substance vapour contained in the particle transport gas can be avoided from being vapour-deposited on the main body 22 of the ink particle. The non-pure substance removing device 24 is constituted by an air filter device **24*p* and a mist removing device 24*m*. Note that either one of the air filter device 24*p* and mist removing device 24*m*** can be omitted.

Figure 3:
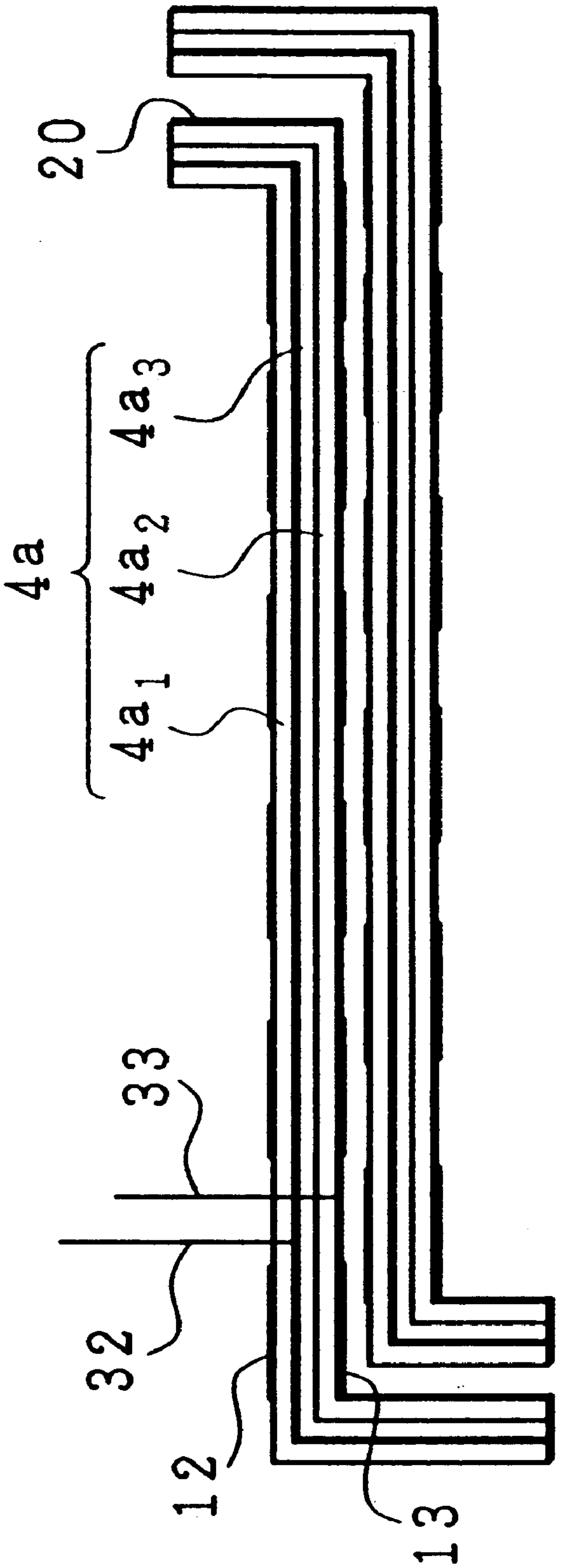
FIG. 3 is an enlarged cross-sectional view showing the particle introduction section of the aforementioned manufacturing device.

The particle introduction section 4 is provided with a particle introduction pipe **4*a* that protrudes into the vapour outlet 2*e* of the vapour deposition box 2 at an end thereof and is coupled to the particle introduction port 20. The particle introduction pipe 4*a* has a three-layered structure of an outer wall portion 4$a_1$, an inner wall portion 4$a_2$, and a heat insulating material layer 4$a_3$ disposed between the outer wall portion 4$a_1$ and the inner wall portion 4$a_2$, as shown in FIG. 3**.

By sandwiching the heat insulating material layer 4$a_3$ between the outer wall portion 4$a_1$ and the inner wall portion 4$a_2$ in this manner, the temperature of the space inside the particle introduction pipe **4*a* is prevented from increasing due to the saturated, vapourised modifier 21, and the saturated, vapourised modifier 21 is prevented from being vapour-deposited on the outer wall portion 4$a_1$. Moreover, the temperature of the outer wall portion 4$a_1$ and the inner wall portion 4$a_2$ can be adjusted precisely and quickly. Note that although the particle introduction pipe 4*a*** preferably has the aforementioned three-layered structure, this is not the only possible structure.

The cooling device 13, being provided on the inner wall portion 4$a_2$ of the particle introduction pipe **4*a*, is for cooling the main body 22 of the ink particle and the particle transport gas, before the main body 22 of the ink particle and the particle transport gas reach the particle introduction port 20 in the particle introduction section 4, to a temperature where oversaturated vapour can be produced around the main body 22 of the ink particle upon mixing the main body 22 of the ink particle and the particle transport gas with the saturated, vapourised modifier 21. Hence, by simply mixing the cooled main body 22 of the ink particle with the saturated, vapourised modifier 21 in the mixer section 9, an atmosphere of the oversaturated, vapourised modifier 21 can be formed around the main body 22** of the ink particle.

The particle introduction pipe **4*a* is provided on the inner wall portion 4$a_2$ thereof with a thermometer 33 for measuring the temperature of the main body 22 of the ink particle and the particle transport gas, before the main body 22 of the ink particle and the particle transport gas reach the particle introduction port 20 in the particle introduction section 4. Based on the temperature detected by the thermometer 33, the cooling device 13 adjusts the temperature of the main body 22 of the ink particle and the particle transport gas to a temperature where at least the main body 22** of the ink particle is not transformed, deformed, or changed in state by heat.

Hence, transformation, deformation, and change in state of the main body 22 of the ink particle that are caused by heating by the saturated, vapourised modifier 21 can be prevented during the transport stage through the particle introduction section 4 before the main body 22 of the ink particle is mixed with the saturated, vapourised modifier 21 in the mixer section 9.

The cooling device 13 is, for example, constituted by a Peltier element for cooling with Peltier effect. Note that the cooling device 13 is not limited to the foregoing; various devices can be employed depending on the targeted temperature in cooling, including devices for cooling using an organic solvent that is cooled by a cooling medium such as liquid nitrogen, water, or dry ice, and those for cooling using water or ice that is cooled with a Liebig condensing pipe.

The particle introduction pipe **4*a* is provided on the outer wall portion 4$a_1$ thereof with a thermometer 32 for measuring the temperature of the outer wall portion 4$a_1$ and, a heating device 12 for heating the outer wall portion 4$a_1$. Based on the temperature detected by the thermometer 32, the heating device 12 adjusts the temperature of the outer wall portion 4$a_1$ to the temperature of the vapour generating space 2*b* in the vapour deposition box 2, that is, to a temperature higher than that of the saturated, vapourised modifier 21. Hence, the modifier 21, having been vapourised to a saturation point in the vapour deposition box 2, can be prevented from being cooled by the outer wall portion 4$a_1$ and vapour-deposited on the surface of the outer wall portion 4**$a_1$.

Note that although the particle introduction pipe **4*a* is preferably provided with the thermometers 32 and 33, the heating device 12, and the cooling device 13, there is an alternative: any particle introduction pipe 4*a* may be used as long as at least a part of a member, of the particle introduction section 4**, opposing the passage for the particle flow is cooled.

The part of the particle introduction pipe 4*a*, which protrudes and is exposed in the vapour generating space 2*b* in the vapour deposition box 2, is preferably short for the sake of prevention of heating by the saturated, vapourised modifier 21. Furthermore, although the particle introduction pipe 4*a* is preferably provided perpendicular to the direction of the saturated vapour flow in the vapour outlet 2*e* of the vapour deposition box 2, there is an alternative: for example, the particle introduction pipe 4*a* may be erected, substantially parallel to the direction of the saturated vapour flow through the vapour outlet 2*e*, on the bottom portion of the vapour deposition box 2.

To the end of the particle introduction pipe 4*a*, opposite to the particle introduction port 20, is coupled an optical detecting device 4*b* for optically detecting the particle diameters and the particle density of the main bodies22 of the ink particles that have been supplied from the particle supply device 27 but not yet undergone a modification operation. The particle density here is measured in terms of the number of the particles. Hence, it becomes possible to control the supplied amount of the main bodies22 of the ink particles by quickly reflecting results of detection of the particle diameters and the particle density. Note that the optical detecting device 4*b* may be arranged so as to detect either the particle diameters or the particle density.

The optical detecting device 4*b*, having a similar arrangement to that of the optical detecting device 3 detailed later, is provided with translucent plates 4*i* and 4*j* that are similar to the translucent plates 3*e* and 3*f*. The translucent plates 4*i* and 4*j* are provided with a thermometer 31 for measuring the temperature on the translucent plates 4*i* and 4*j* and a heating device 11 for heating the translucent plates 4*i* and 4*j*.

Based on the temperature detected by the thermometer 31, the heating device 11 adjusts the temperature of the translucent plates 4*i* and 4*j* to a temperature higher than that where the non-pure substance vapour contained in a minimal amount in the particle transport gas can be condensed. Hence, the non-pure substance vapour contained in a minimal amount in the particle transport gas can be prevented from being cooled in the particle introduction section 4 and vapour-deposited on the translucent plates 4*i* and 4*j*, which otherwise would make it difficult to detect the particle diameters or the particle density using the optical detecting device 4*b*. Note that alternatively, the thermometer 31 and the heating device 11 may be arranged so as to measure and adjust the temperature of the inner surface of the optical detecting device 4*b*, and also may be arranged so as to measure and adjust the temperature of the space inside the optical detecting device 4*b*.

The optical detecting device 4*b* is coupled via a coupling pipe 4*c* to the non-pure substance removing device 24 and the particle supply device 27. The coupling pipe 4*c* is provided on an inner surface thereof with the cooling device 10 for cooling the inner surface of the coupling pipe 4*c* and the thermometer 30 for measuring the temperature of the inner surface of the coupling pipe 4*c*.

The cooling device 10 is for cooling, based on the temperature detected by the thermometer 30, the inner surface of the coupling pipe 4*c* to a temperature where an oversaturated atmosphere can be formed around the main body 22 of the ink particle by mixing the main body 22 of the ink particle with the saturated, vapourised modifier 21. Moreover, the cooling device 10 adjusts the temperature of the inner surface of the coupling pipe 4*c* to a temperature where at least the main body 22 of the ink particle is not transformed, deformed, or changed in state due to heat. Therefore, deficiencies such as transformation, deformation, and change in state of the main body 22 of the ink particle that are caused by heat can be prevented during the transport stage between the non-pure substance removing device 24 and the optical detecting device 4*b* before the main body 22 of the ink particle is mixed with the saturated, vapourised modifier 21 in the mixer section 9.

The mixer section 9 is coupled to the vapour outlet 2*e* of the vapour deposition box 2, and has a linearly extending pipe shape. The mixer section 9 should incline so that the angle θ to the upper surface (i.e. horizontal surface) of the vapour deposition box 2 is in a range of 1° to 179°, and is preferably erected so that the angle θ to a horizontal direction is substantially equal to 90°, or specifically, in a range of 80° to 100°.

If the angle θ to the horizontal surface of the mixer section 9 is in the aforementioned range, even if a small amount of the vapourised modifier 21 self-condenses on the inner surface of the mixer section 9 during a transmission from a saturation state to an oversaturation state due to the mixture of the vapourised modifier 21 with the cooled main body 22 of the ink particle, the modifier 21 that has condensed on the inner surface and thus is in a liquid state is pulled down by gravity and returns to the vapour deposition box 2.

Hence, it becomes possible to recycle the modifier 21 by heating the modifier 21 again in the vapour deposition box 2 to form saturated vapour. As a result, it is possible to reduce the used amount of the modifier 21 and the manufacturing cost of the modified main body 22 of the ink particle (hereinafter, will be referred to as a modified particle), as well as to reduce the cost in disposing the modifier 21. Moreover, if the angle θ is in the aforementioned range, it becomes easier to remove the modified particle from the mixer section 9 owing to the flow of the saturated vapour heated in the vapour deposition box 2.

The mixer section 9 has a processing space 9*b* in a pipe wall portion 9*a*, and is provided on an outer surface thereof with a temperature adjusting device 14 that acts as temperature adjust means for adjusting the temperature of the processing space 9*b*. Moreover, the mixer section 9 is provided with a thermometer 34 for detecting the temperature of the processing space 9*b*. The temperature adjusting device 14 is for adjusting the temperature T4 of the processing space 9*b* of the mixer section 9 to satisfy T2>T4>T3>T1, T2>T3>T4>T1, or T2>T3>T1>T4, in accordance with a control signal transmitted from a control device (not shown) based on the temperature detected by the thermometer 34.

Here, T1 denotes the temperature of the cooled main body 22 of the ink particle measured with the thermometer 33, T2 denotes the temperature of the saturated, vapourised modifier 21 measured with the thermometer 8, T3 denotes the temperature of a mixed gas obtained by mixing the main body 22 of the ink particle with the saturated, vapourised modifier 21.

By the temperature adjusting device 14 adjusting the temperature T4 of the processing space 9*b* of the mixer section 9 so as to be higher than the temperature T3 of the aforementioned mixed gas in this manner, the saturated, vapourised modifier 21 in the processing space 9*b* is avoided from condensing on the inner surface of the pipe wall portion 9*a* of the mixer section 9. Moreover, the wasting of the modifier 21 due to the deposition on the pipe wall portion 9*a* of the mixer section 9 is restrained, and the material can be efficiently used. Therefore, an efficient vapour deposition phenomena can be obtained, as well as a smaller amount of the modifier 21 is wasted.

Furthermore, by the temperature adjusting device 14 adjusting the temperature T4 of the processing space 9*b* of the mixer section 9 so as to be lower than the temperature T2 of the saturated, vapourised modifier 21, the oversaturated, vapourised modifier 21 can be surely produced in the processing space 9*b* of the mixer section 9. Moreover, by controlling the temperature adjusting device 14 so that the temperature T4 of the processing space 9*b* of the mixer section 9 satisfies T2>T3>T4>T1 or T2>T3>T1>T4, the modifier 21 is oversaturated to a higher degree, resulting in larger particles. Note that the temperature adjusting device 14 may be, for example, a device that variably controls temperature from −15° C. to 70° C.

The mixer section 9 is coupled at an upper end thereof via the optical detecting device 3 to a particle exhaust outlet 5 for removing modified particles from the manufacturing device 1. Moreover, the transport path in the mixer section 9 extends to a point between a light emitting section 3*i* and a light receiving section 3*j* in the optical detecting device 3.

The optical detecting device 3 is for optically detecting the particle diameters and the particle density of the modified particles. The optical detecting device 3 is provided on an upper end of the mixer section 9, and has a light emitting section 3*i* and a light receiving section 3*j* that are disposed so as to face each other. The light emitting section 3*i* is provided with a light source 3*a*, a lens 3*b*, a translucent plate 3*e* and a case 3*h* for housing them. The light receiving section 3*j* is provided with a translucent plate 3*f*, a light detecting device 3*g* and a case 3*h* for housing them. Note that the optical detecting device 3 may be arranged so as to detect either the particle diameters or the particle density.

The optical detecting device 3 belongs to conventional technology. The optical detecting device 3 is for detecting the particle diameters and the particle density with a light transmitting and dispersing technique. Principles in detecting the particle diameters and the particle density with a light transmitting and dispersing technique is well-known: for example, "Particle Measuring Technology" (edited by Japan Society of Powder Engineering, published by The Nikkan Kogyo Shimbun Ltd.) explains the technique in detail. The publication also explains other typical techniques of detecting the particle diameters and the particle density, including an X-ray transmitting technique, a sedimentation technique, a laser diffraction and dispersion technique, a photon correlation technique using a dynamic dispersion technique, an X-ray transmission technique using a dynamic dispersion technique. Note that in the present invention, techniques other than that using the optical detecting device 3 can be employed to detect the particle diameters and the particle density: for example, an image analysing technique using an optical microscope or an electron microscope.

The provision of the optical detecting device 3 to the manufacturing device 1 allows the control of the particle diameters and the particle density of the modified particles by quickly reflecting results of detection of the particle diameters and the particle density. As a result, the following effects (1) to (4) are achieved:

(1) It becomes possible to control the film thickness of the modifier 21 formed on the surface of the main body 22 of the ink particle. The film thickness varies depending on the temperature of the main body 22 of the ink particle, the temperature of the vapourised modifier 21, the temperature of the mixer section 9, the ratio of flowing amounts of the main body 22 of the ink particle and of the vapourised modifier 21, and the particle density. The film thickness is smaller when the particle density is greater, and can be controlled by adjusting the temperature or the particle density in advance according to the particle density. Moreover, the optical detecting device 3, since being able to detect the particle diameters, i.e. the sizes of the main bodies22 of the ink particles, can precisely control the film thickness.

(2) It becomes possible to adjust the productivity of modified particles. The productivity varies depending on the particle density, and increases as the particle density becomes higher. Therefore, the productivity can be controlled by adjusting the particle density in advance according to the particle density detected by the optical detecting device 3.

(3) It becomes possible to improve the reproductivity of the modified particles. To be more specific, if the same particle diameters and particle density, which are detected by the optical detecting device 3, are given to the newly modified particles and to the modified particles previously used in operation, the newly modified particles will have properties similar to those of the previously modified particles.

(4) It becomes possible to detect and prevent a coreless condensation phenomenon of the modifier 21 by comparing the particle density of the modified particles with the particle density of the main bodies22 of the ink particles.

The translucent plates 3*e* and 3*f* of the optical detecting device 3 is provided with a thermometer 35 for measuring the temperature of the translucent plates 3*e* and 3*f*, and a heating device 15 for heating the translucent plates 3*e* and 3*f* so that the temperature thereof is higher than temperatures where the modifier 21 is vapour-deposited. Hence, the heating device 15 adjusts, according to the temperature detected by the thermometer 35, the temperature of the translucent plates 3*e* and 3*f* to a temperature higher than that where the modifier 21 can be vapour-deposited. Hence, the modifier 21, having been vapourised to reach a saturation point in the vapour deposition box 2, can be prevented from being cooled in the mixer section 9 and vapour-deposited on the translucent plates 3*e* and 3*f*, which would otherwise hamper the detection by the optical detecting device 3 of the particle diameters and the particle density.

Note that the thermometer 35 and the heating device 15 may be arranged so as to measure and adjust the temperature of the inner surface of the optical detecting device 3, and alternatively may be arranged so as to measure and adjust the temperature of the inner space of the optical detecting device 3.

Figure 4:
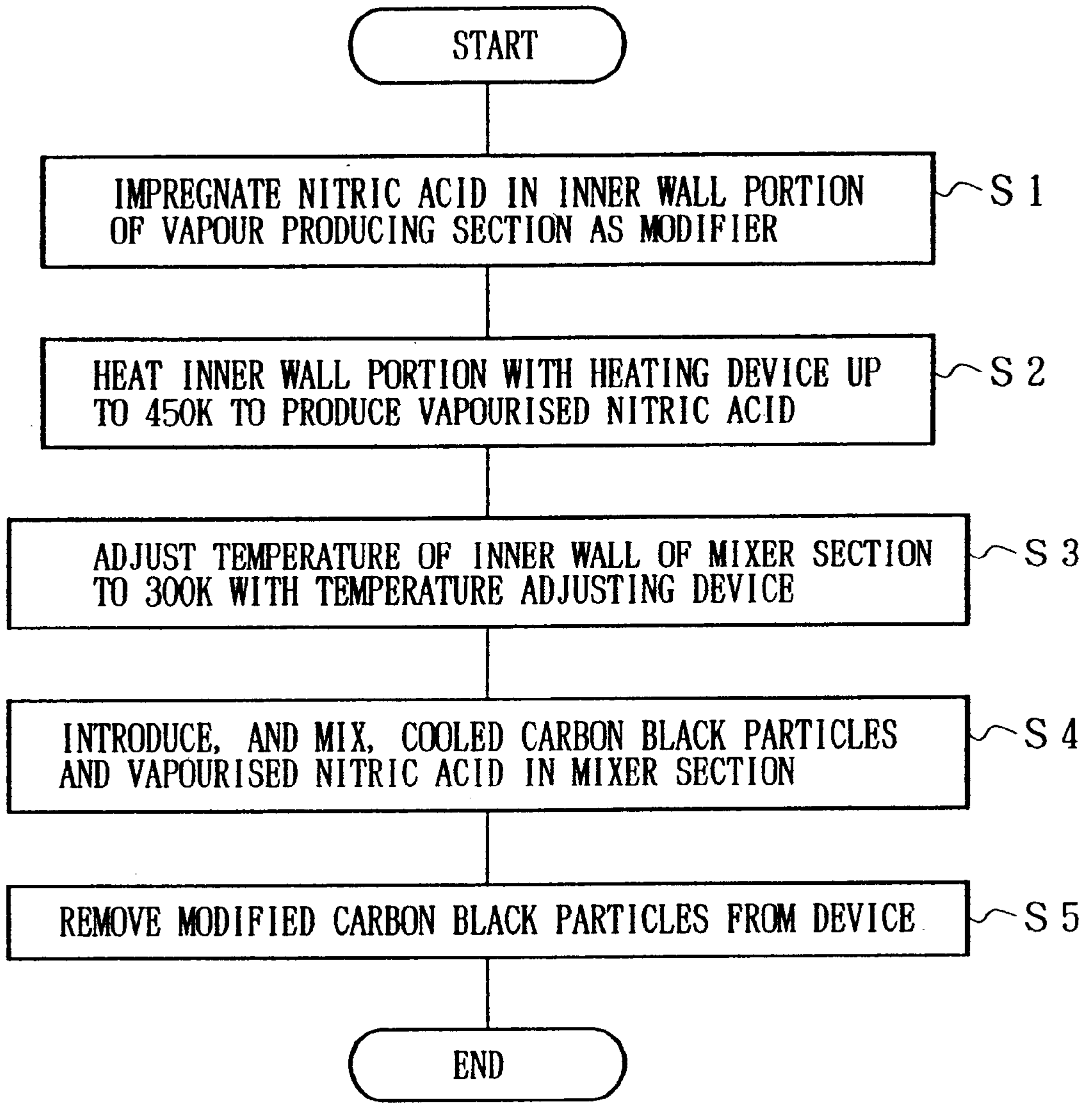
FIG. 4 is a flow chart for a manufacturing method of the modified ink particles of the first embodiment in accordance with the present invention.

Now, referring to the flow chart shown in FIG. 4, the following description will explain a manufacturing method of modified particles (modified ink particles), using the manufacturing device 1 arranged in the aforementioned manner.

According to the manufacturing method, first, the inner wall portion $2a_2$ of the vapour deposition box (vapour producing section) 2 is caused to absorb nitric acid as the modifier 21 (step 1; hereinafter, "step" will be abbreviated as S), and heated with the heating device 7 so that the temperature of the inner wall portion $2a_2$ reaches 450 K (S2). Hence, vapourised nitric acid is produced in the vapour generating space 2*b*. Subsequently, by controlling the temperature adjusting device 14, the processing space 9*b* in the mixer section 9 is heated to a temperature of 300 K (S3).

Thereafter, carbon black particles having a geometrical mean diameter of about 0.5 $\mu$m and a particle density of $10^{12}$ pieces/$m^3$ are introduced, as the main bodies22 of the ink particles, through the particle introduction port 20 to the vapour generating space 2*b* in the vapour deposition box 2. The introduced carbon black particles are transported to the mixer section 9 together with the vapourised nitric acid filling the vapour generating space 2*b*. Hence, in the mixer section 9, the vapourised nitric acid is mixed with the carbon black particles, and a mixture gas of the vapourised nitric acid and the carbon black particles is obtained (S4).

Here, the vapourised nitric acid is cooled by the carbon black particles and reaches an oversaturation state. As a result, the nitric acid is vapour-deposited on the surface of the carbon black particle, and the surface of the carbon black particle is coated with a nitric acid film. Hence, a modified portion 57 having a carboxyl group produced by the oxidisation by the nitric acid is formed on the main body 22 of the ink particle (see FIG. 1(*b*)). Thereafter, the processed carbon black particles (modified particles) are removed from the device (S5), and washed using pure flowing water to complete the operation.

Figure 5:
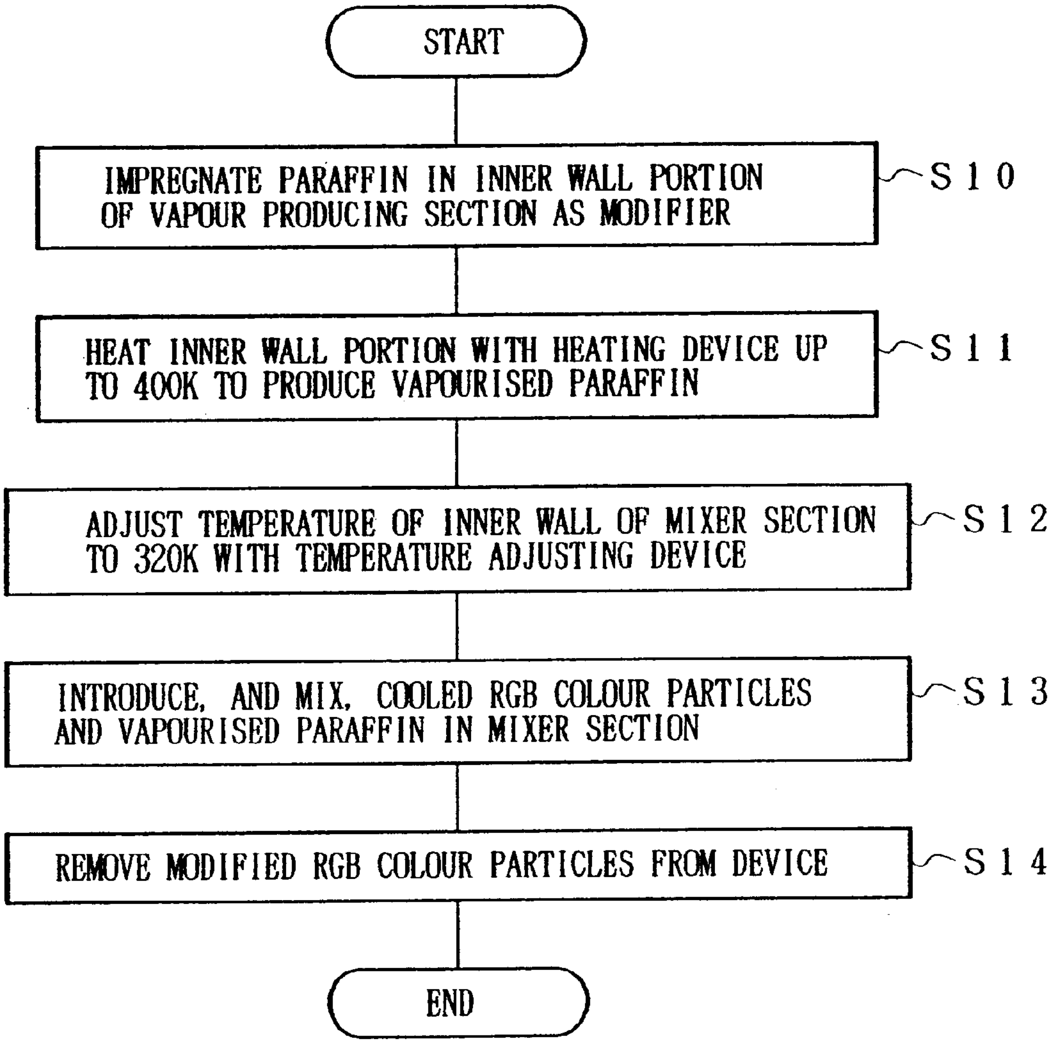
FIG. 5 is a flow chart for another manufacturing method of the modified ink particles of the first embodiment in accordance with the present invention.

Now, referring to the flow chart shown in FIG. 5, the following description will explain a manufacturing method of modified particles prepared by imparting hydrophobic (water repellent) properties to hydrophilic particles such as the main bodies22 of the ink particles for the RGB use in a colour filter.

First, olefin, paraffin, or another substance is used as the modifier 21. The inner wall portion $2a_2$ of the vapour deposition box (vapour producing section) 2 is caused to absorb the modifier 21 (S10), and the inner wall portion $2a_2$ is heated to a temperature of 400 K using the heating device 7 (S11). Hence, the vapourised modifier 21 is produced in the vapour generating space 2*b*. Subsequently, by controlling the temperature adjusting device 14, the processing space 9*b* in the mixer section 9 is heated to a temperature of 320 K (S12).

Thereafter, the main bodies22 of the ink particles for the RGB use in the colour filter having a geometrical mean diameter of about 0.5 $\mu$m and a particle density of $10^{12}$ pieces/m$^3$ are introduced, as the main bodies22 of the ink particles, through the particle introduction port 20 to the vapour generating space 2*b* in the vapour deposition box 2. The introduced main bodies22 of the ink particles are transported to the mixer section 9 together with the vapourised modifier 21 filling the vapour generating space 2*b*. Hence, in the mixer section 9, the vapourised modifier 21 is mixed with the main bodies22 of the ink particles, a mixture gas of the vapourised modifier 21 and the main bodies22 of the ink particles are obtained (S13).

Here, the vapourised modifier 21 is cooled by the main bodies22 of the ink particles and reaches an oversaturation state. As a result, the modifier 21 is vapour-deposited on the surface of the main body 22 of the ink particle, and the surface of the main body 22 of the ink particle is coated with a film of the modifier 21. Hence, a modified portion 57 having a hydrophobic surface is formed on the main body 22 of the ink particle (see FIG. 1(*a*)). Thereafter, the processed ink particles (modified particles) are removed from the device (S14), and washed using pure flowing water to complete the operation.

As explained above, the manufacturing device 1 of the modified ink particle in accordance with the present invention is arranged to include a mixer section 22*b* for, in order to impart hydrophilic or hydrophobic properties to the main body 22 of the ink particle, bringing the main body 22 of the ink particle into contact with vapourised nitric acid, paraffin, or other substances having a temperature higher than that of the main body 22 of the ink particle, thus forming an oversaturation atmosphere of the vapour, and vapour-depositing the modifier 21 such as nitric acid on the surface of the main body 22 of the ink particle.

With the aforementioned arrangement, modified ink particles having relatively small and homogeneous particle diameters can be manufactured without charging the particles, by means of a simple device and operation, in a short time, and at low costs.

Note that although the manufacturing device 1 capable of continuously manufacturing modified ink particles was taken as an example in the aforementioned explanation, the specific arrangement of the manufacturing device is not limited to the aforementioned arrangement which was meant to be nothing but an example. The manufacturing device of a modified ink particle in accordance with the present invention may include an arrangement to manufacture modified ink particles using a batch technique. The manufacturing steps by the aforementioned manufacturing device is controlled by control means such as a microcomputer (not shown) having programs installed inside thereof.

Moreover, although the manufacturing device 1 including an arrangement to form an oversaturation atmosphere by cooling the vapourised modifier 21 such as nitric acid was taken as an example in the aforementioned explanation, the manufacturing device may include an arrangement to form an oversaturation atmosphere (oversaturated vapour) by means of adiabatic expansion of the vapour.

Figure 6:
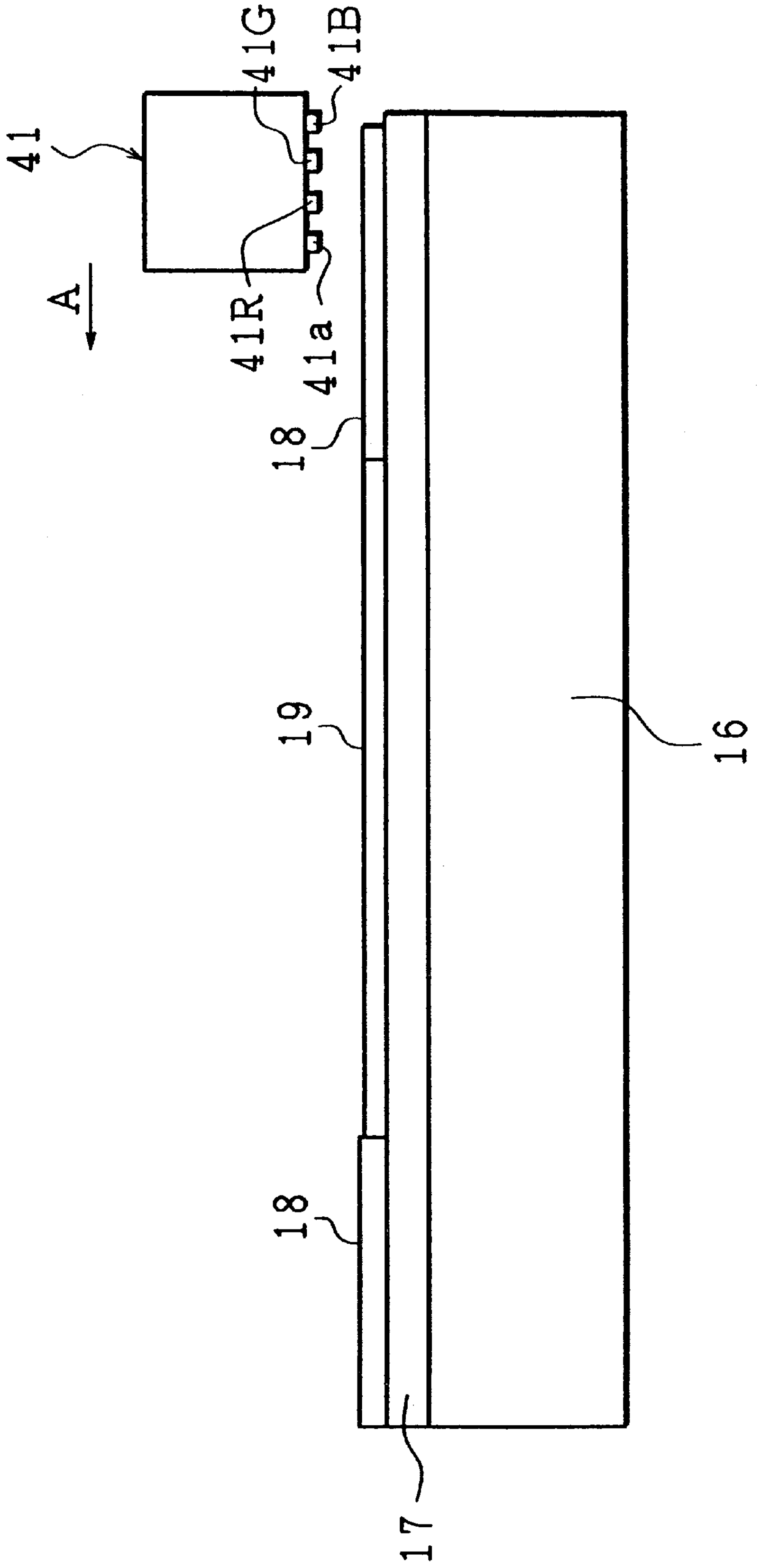
FIG. 6 is a schematic cross-sectional view showing a colour filter and a manufacturing method thereof in accordance with the present invention.

Now, referring to FIG. 6, the following description will explain a manufacturing method of a colour filter such that a colour filter layer is formed on a plastic substrate (water repellent substrate) with an ink jet technique using the main body 22 of the ink particle having the modified surface as the modified ink particle.

A water repellent resin layer 17 is formed on a plastic substrate 16 by uniformly coating the plastic substrate 16 with, for example, a silicon resin or an epoxy resin that is compatible with the plastic substrate 16, or in other words, that has a good mutual wettability with the plastic substrate 16. The coating is done using a spin coater technique, a roll coater technique, or other techniques.

Thereafter, an ink jet head section 41 is moved parallel to the surface of the water repellent resin layer 17 in the direction indicated by the arrow A while keeping an equal distance from the water repellent resin layer 17, carbon black particles of which the surface has undergone a process to impart hydrophilic properties thereto are ejected from a nozzle 41*a* as modified ink particles, a black matrix layer 18 is formed in a lattice-like shape, and after completing the formation, the ink jet head section 41 is moved to a stand-by position (not shown). Note that although in the foregoing, the black matrix layer 18 was formed in a lattice-like shape as an example, the black matrix layer 18 may take a different shape according to the configuration of the later-mentioned colour filter layer 19: for example, the black matrix layer 18 may be provided, according to the triangular shape of the colour filter layer 19, so as to exist along the interfaces between the RGB colour sections thereof.

Next, in the same manner as above, the ink jet head section 41 is moved parallel to the surface of the water repellent resin layer 17 in the direction indicated by the arrow A while keeping an equal distance from water repellent resin layer 17, ink particles for the RGB use of which the surface has undergone a process to impart water repellent properties thereto are ejected from respective nozzles 41B, 41G, and 41R as modified ink particles, and the colour filter layer 19 is formed from the RGB modified ink particles. After completing the formation of the colour filter layer 19, the ink jet head section 41 is moved to a stand-by position (not shown).

Although the RGB colour sections in the colour filter layer 19 may be arranged in any pattern: for example, a mosaic pattern, a stripe pattern, a triangle pattern, or a four-pixels-arrangement pattern.

Moreover, since the nozzles 41B, 41G, and 41R are aligned along the moving direction of the ink jet head section 41, the three colour sections can be formed in a single step by adjusting the timing at which the ink particles are ejected from the nozzles 41B, 41G, and 41R. Thus, in the present invention, the colour filter layer 19 can be formed in a single step, whereas the conventional technique, such as a dyeing technique, a pigment dispersion technique, an electrodeposition technique, and a printing technique, required at least three repetitions of the step to form the trichromatic, i.e. RGB, colour filter layer. Therefore, the manufacturing of the colour filter is facilitated, and the yield is improved, allowing to cut costs.

Thereafter, the plastic substrate 16 provided with the aforementioned black matrix layer 18 and the colour filter layer 19 is cured by heat as it undergoes a baking process at a temperature of 470 K. Here, since the plastic substrate 16, the water repellent resin layer 17 formed thereon, and the colour filter layer 19 formed further thereon are mutually compatible with the ink particles and have mutual wettability, they do not repel each other when placed adjacent to each other, and pin holes and other structural deficiencies are prevented from occurring in the colour filter layer 19.

Thereafter, one of the two liquid crystal substrates is formed by forming opposite electrodes of ITO on the colour filter layer 19, and performing a predetermined patterning on the opposite electrodes, and thereafter this liquid crystal substrate is combined with another of the two liquid crystal substrates on which drive elements have been formed. Then, liquid crystal is injected between the combined liquid crystal substrates and sealed to complete the formation of a liquid crystal display panel. The drive element may be a three terminal element such as a TFT (Thin Film Transistor) or a two terminal element such as an MIM (Metal Insulator Metal) diode.

Figure 7:
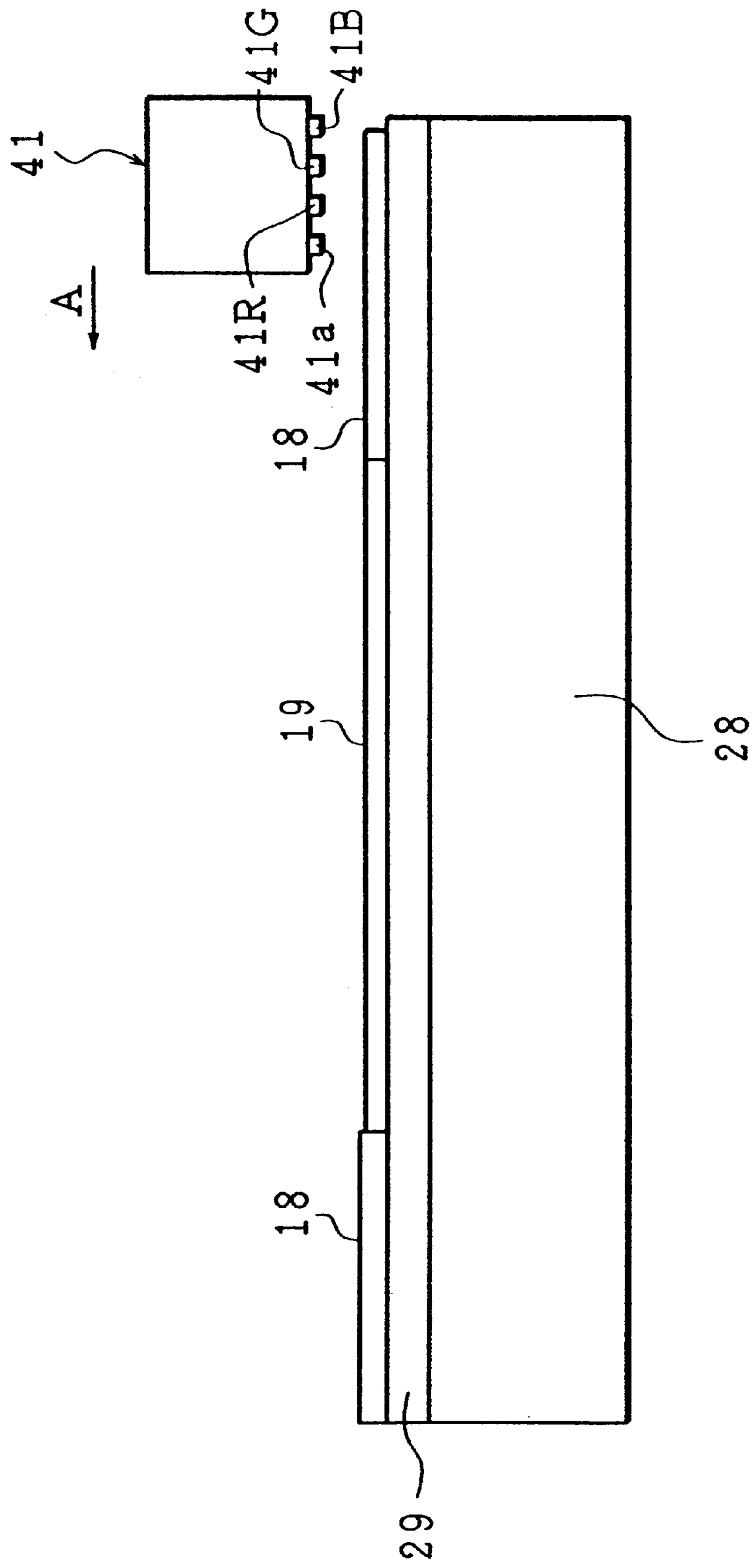
FIG. 7 is a schematic cross-sectional view showing another colour filter and a manufacturing method thereof in accordance with the present invention.

Now, referring to FIG. 7, the following description will explain a manufacturing method of a colour filter such that a colour filter layer is formed on a glass substrate (hydrophilic substrate) with an ink jet technique using the modified main body 22 of the ink particle.

A hydrophilic resin layer 29 is formed on the glass substrate 28 by uniformly coating the glass substrate 28 with, for example, a polyvinyl alcohol resin that is compatible with the glass substrate 28, or in other words, that has a good mutual wettability with the glass substrate 28. The coating is done using a spin coater technique, a roll coater technique, or other techniques.

Thereafter, the ink jet head section 41 is moved parallel to the surface of the hydrophilic resin layer 29 in the direction indicated by the arrow A while keeping an equal distance from the hydrophilic resin layer 29, carbon black particles of which the surface has undergone a process to impart hydrophilic properties thereto are ejected from the nozzle 41*a* as modified ink particles, a black matrix layer 18 is formed, for example, in a lattice-like shape, and after completing the formation, the ink jet head section 41 is moved to a stand-by position (not shown).

Next, in the same manner as above, the ink jet head section 41 is moved parallel to the surface of the hydrophilic resin layer 29 in the direction indicated by the arrow A while keeping an equal distance from hydrophilic resin layer 29, ink particles for the RGB use of which the surface has undergone a process to impart water repellent properties thereto are ejected from the respective nozzles 41B, 41G, and 41R as modified ink particles, and the colour filter layer 19 is formed, in the same manner as above, of the RGB modified ink particles. After completing the formation of the colour filter layer 19, the ink jet head section 41 is moved to a stand-by position (not shown).

Thereafter, the glass substrate 28 provided with the aforementioned black matrix layer 18 and the colour filter layer 19 is cured by heat as it undergoes a baking process at a temperature of 470 K. Here, since the glass substrate 28, the hydrophilic resin layer 29 formed thereon, and the colour filter layer 19 formed further thereon are mutually compatible with the ink particles and have mutual wettability, they do not repel each other when placed adjacent to each other, and pin holes and other structural deficiencies are prevented from occurring in the colour filter layer 19.

Thereafter, one of the two liquid crystal substrates is formed by forming opposite electrodes of ITO on the colour filter layer 19, and performing a predetermined patterning on the opposite electrodes, and thereafter this liquid crystal substrate is combined with another of the two liquid crystal substrates on which drive elements have been formed. Then, liquid crystal is injected between the combined liquid crystal substrates and sealed to complete the formation of a liquid crystal display panel. The drive element may be a three terminal element such as a TFT or a two terminal element such as an MIM.

As explained above, with the colour filter in accordance with the present invention, which employs the modified ink particle in accordance with the present invention, pin holes and other deficiencies can be prevented from occurring, and the colour filter layer 19 is formed having a smooth surface. Therefore, display quality is improved.

Furthermore, according to the manufacturing method of the colour filter in accordance with the present invention, the colour filter layer 19 can be formed in a single step, and the black matrix layer 18 and the colour filter layer 19 having excellent properties can be formed in a similar manner regardless of the hydrophilic or hydrophobic properties of the substrate used. Therefore, the manufacturing of the colour filter can be facilitated, and the yield is improved compared to the conventional technology, allowing a cut in costs.

In addition, with a colour display device, such as a liquid crystal display panel, incorporating such a colour filter, it becomes possible to cut down on the cost and improve display quality at the same time due to the low cost and high display quality of the colour fu filter.

Embodiment 2

Figure 8:
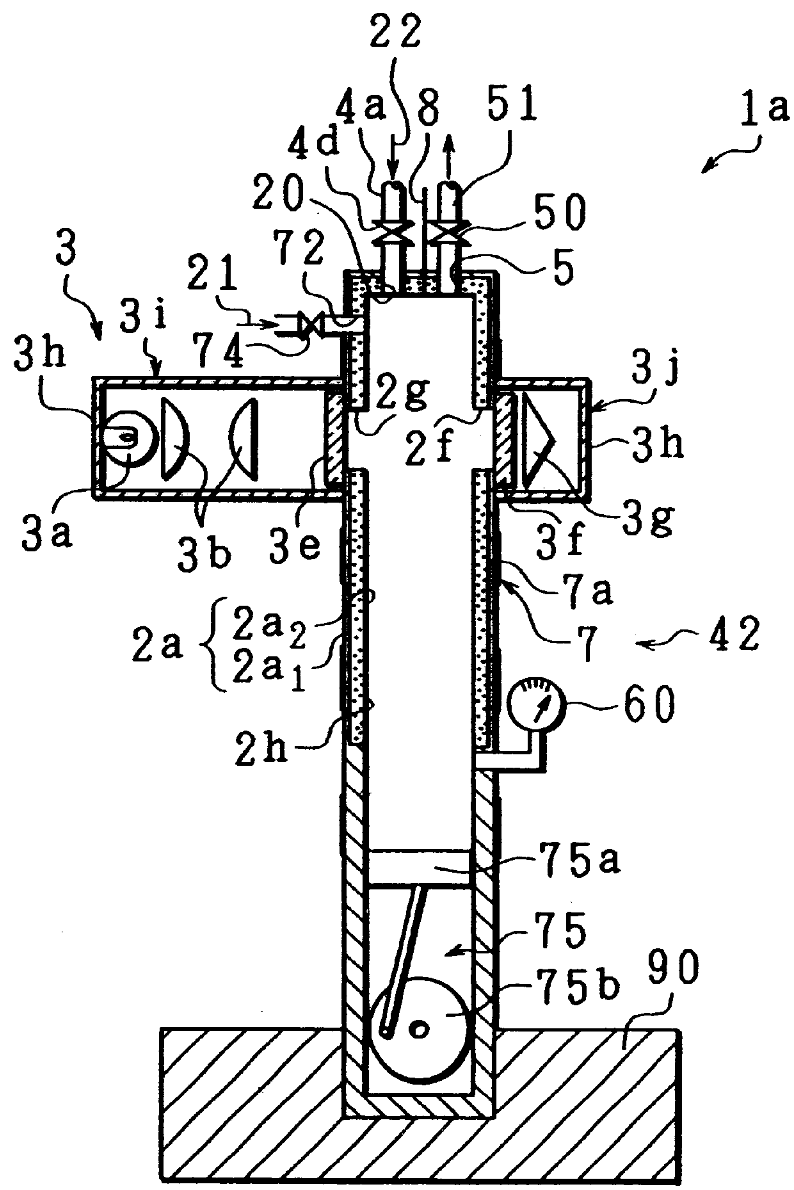
FIG. 8 is a cross-sectional view schematically showing the arrangement of a manufacturing device for modified ink particles of a second embodiment in accordance with the present invention.

The manufacturing device of a modified ink particle of the second embodiment in accordance with the present invention is a manufacturing device la shown in FIG. 8, for forming oversaturated vapour with adiabatic expansion, which is a variation of the aforementioned manufacturing device 1 detailed in the first embodiment. Here, for convenience, members of the manufacturing device 1*a* of the second embodiment that have the same arrangement and function as members of the manufacturing device 1 of the first embodiment, and that are mentioned in the first embodiment are indicated by the same reference numerals in FIG. 8 and description thereof is omitted.

Figure 9:
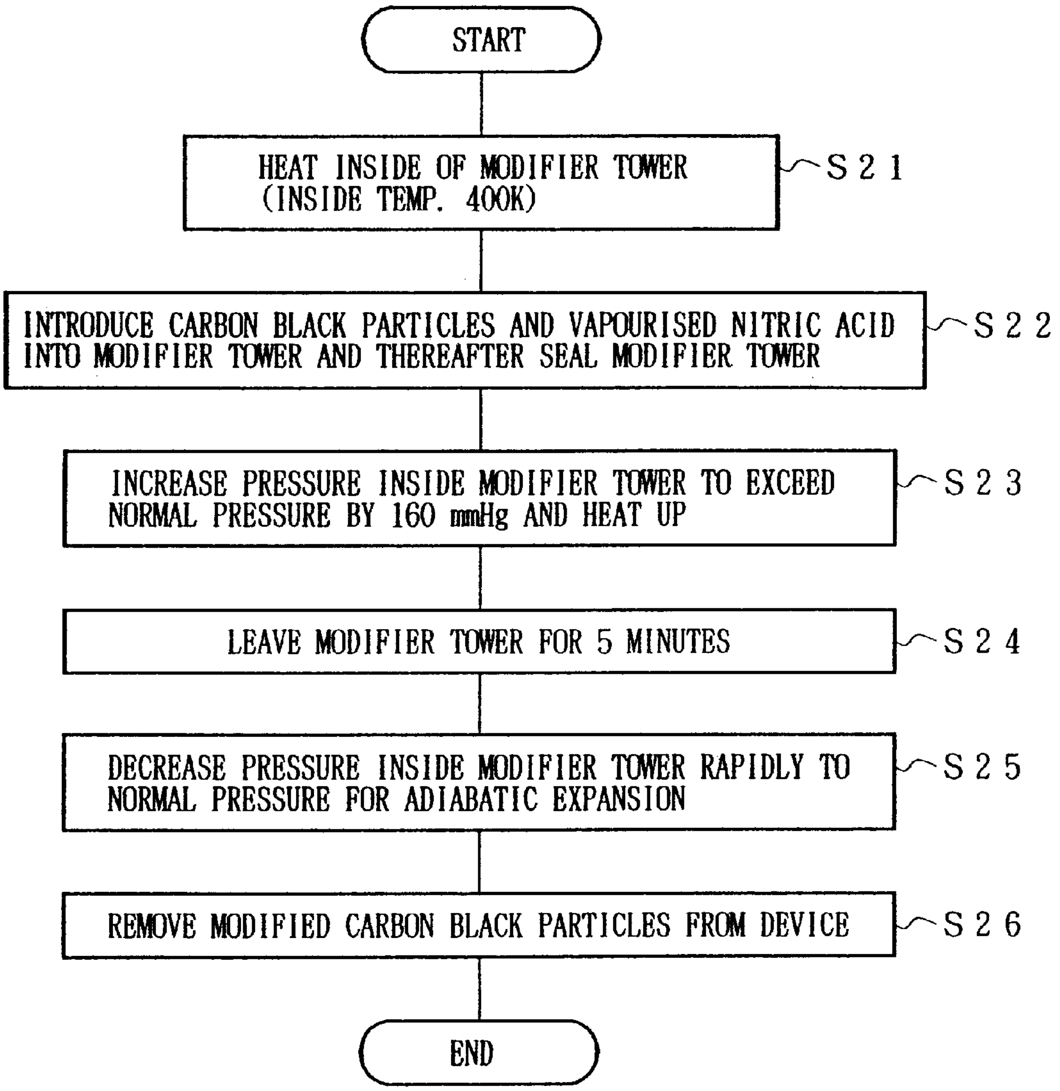
FIG. 9 is a flow chart for a manufacturing method of the modified ink particles of the second embodiment in accordance with the present invention.
Figure 10:
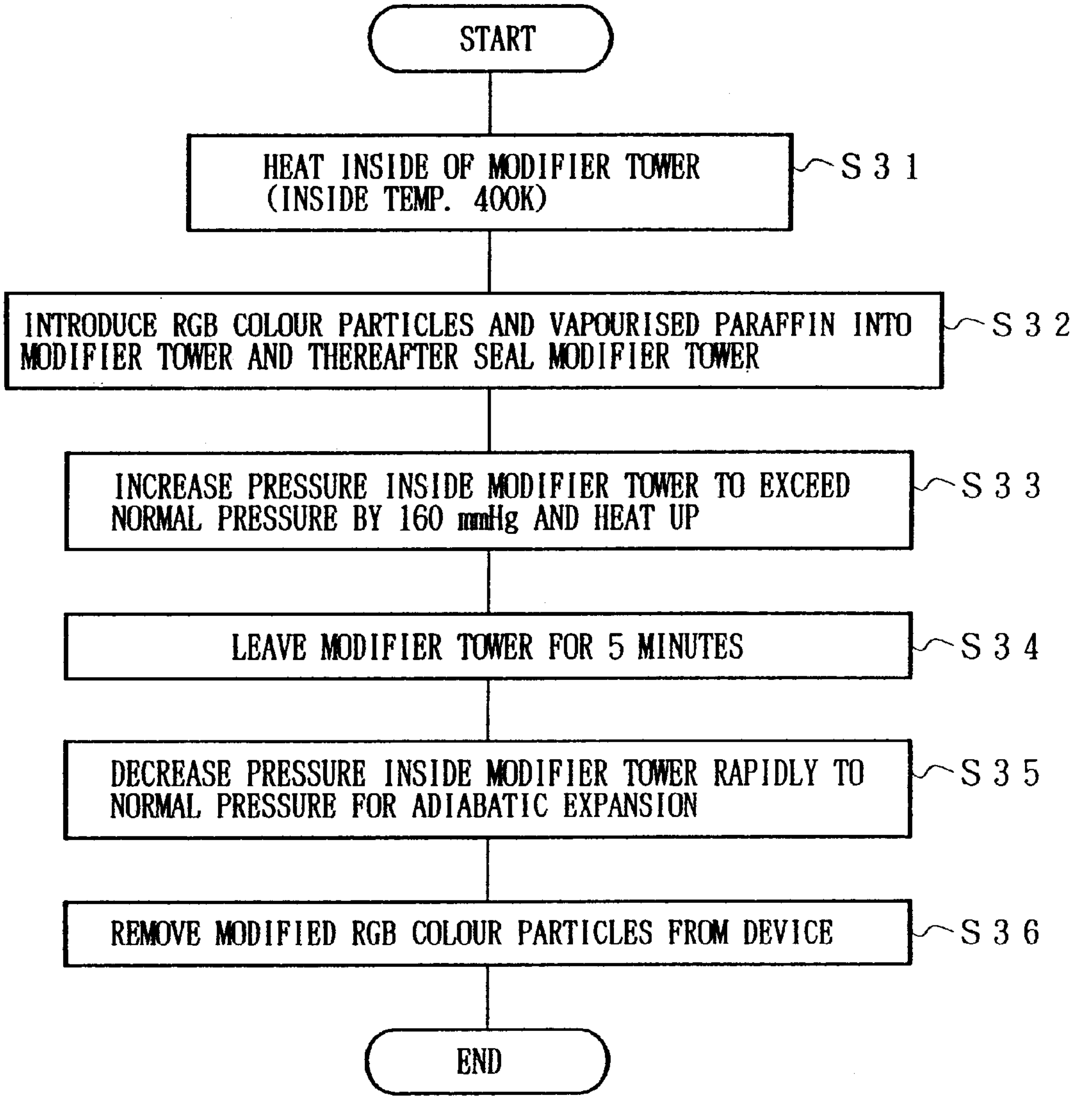
FIG. 10 is a flow chart for another manufacturing method of the modified ink particles of a second embodiment in accordance with the present invention.

Now, referring to the flow charts shown in FIGS. 9 and 10, the following description will explain a manufacturing method of the modified ink particle, using the manufacturing device 1*a*, to explain the arrangements of the manufacturing device 1*a*.

The manufacturing method of carbon black particles equipped with hydrophilic properties as modified ink particles for a black matrix use will be explained in accordance with the aforementioned manufacturing method. First, the arrangements shown in FIG. 8 are all initialised to start manufacturing, and subsequently, the temperature of the inner wall portion 2$a_2$ is adjusted with the heating device 7 of a modification tower (modifier tower, or modification operating section) 42 to, for example, 400 K when nitric acid is used as a modifier 21 (S21).

The modification tower 42 is erected on a base 90, and has a function of the vapour deposition box 2 and that of the mixer section 9 of the aforementioned first embodiment. Therefore, the processing space 2*h* of the modification tower 42 has a function of the vapour generating space 2*b* of the vapour deposition box 2 and that of the processing space 9*b* of the mixer section 9.

Next, carbon black particles having a geometrical mean diameter of about 0.5 $\mu$m and a particle density of $10^{11}$ pieces/$m^3$ and nitric acid which acts as the modifier 21 are introduced respectively through a particle introduction port 20 and through the modifier introduction port 72 into the processing space 2*h* by lowering a piston 75*a* of a pressure varying piston 75 with a crank section 75*b* in such a manner to expand the processing space volume of the processing space 2*h*. Thereafter, valves 4*d* and 74 of the particle introduction port 20 and the modifier introduction port 72, as well as the valve 50 of a particle outlet pipe 51 are all closed to seal the processing space 2*h* (S22). Therefore, the lower section of the processing space 2*h* is configured to have a cylinder-like shape so that the piston 75*a* moves back and forth to vary the pressure in the processing space 2*h*.

Next, to obtain saturated nitric acid vapour, the processing space 2*h* is pressurised as well as heated. The pressurisation is done by lifting the piston 75*a*. In the pressurisation, the pressure in the processing space 2*h* of the modification tower 42 is increased to a predetermined pressure higher than normal pressure, for example, to a pressure equal to atmospheric pressure plus 160 mmHg. The pressure in the processing space 2*h* is specified to the predetermined pressure as it is measured with the pressure meter 60. Here, the nitric acid inside the processing space 2*h* is simultaneously heated (S23).

The heating is done using the heating device 7. As the heating device 7 starts running, the heat generated by the heater 7*a* is given to, and thus heats up, the outer wall portion 2$a_1$, the inner wall portion 2$a_2$, and the processing space 2*h*. The temperature inside the processing space 2*h* is measured with the thermometer 8, and the operation of the aforementioned heating device 7 is controlled according to the measured values.

Thereafter, the modification tower 42 is left for a suitable period of time, for example, five minutes until saturated, vapourised nitric acid is obtained in the processing space 2*h* (S24). To obtain saturated vapour, at least the aforementioned pressurisation is essential, while the heating is done only if necessary to supplement the effects of the pressurisation. This is applicable to the embodiments detailed below. Those operations above are controlled by control means (not shown) such as a microcomputer according to detected values of temperature, particle diameters, density, pressure, etc.

Saturated, vapourised nitric acid is obtained in the processing space 2*h* of the modification tower 42 from the above step. In this state, there is saturated, vapourised nitric acid surrounding the carbon black particles. Next, the pressure in the modification tower 42 is rapidly varied, i.e. reduced, to normal pressure (S25). Hence, the saturated, vapourised nitric acid expands adiabatically and reaches an oversaturation state. To reduce the pressure in this manner, the pressure in the processing space 2*h* can be rapidly specified to normal pressure by lowering the piston 75*a* to the lowest position (initial position) thereof.

Here, in the processing space 2*h* containing the carbon black particles, the saturated, vapourised nitric acid reaches an oversaturation state, and there occurs a vapour deposition of vapourised nitric acid on the surfaces of the carbon black particles. As a result, a liquid film is produced on the surfaces of the carbon black particles, and the modified ink particles modified in the aforementioned manner are formed.

The particle diameters and the particle density of the aforementioned modified ink particles are measured with an optical measurement device 3 disposed on a side of the modification tower 42. Therefore, on the side of the modification tower 42 are provided aperture sections 2*g* and 2*f* that respectively face, and are open to, the translucent plates 3*e* and 3*f* of the optical measurement device 3.

The produced modified ink particles are removed and collected from the modification tower 42 through the particle exhaust outlet 5 and the particle exhaust pipe 51 (S26), washed in a similar manner to that mentioned earlier, and then dried before use. The collection is done by lifting the piston 75*a* from the lowest position to the highest position with the valves 4*d* and 74 of the particle introduction port 20 and the modifier introduction port 72 kept closed, and with the valve 50 of the particle outlet pipe 51 kept opened.

Note that although the above description explained an embodiment for introducing the modifier in vapour form through the modifier introduction port 72, saturated vapour may be generated in the processing space 2*h*, using the heating device 7, by arranging at least a part of the inner wall portion 2$a_2$ of the modification tower 42, facing the processing space 2*h*, from a porous material, adhering and impregnating the modifier into the porous material in advance.

Moreover, when the carbon black particles are supplied (introduced) into the processing space 2*h* through the particle supply pipe 4*a*, the carbon black particles passing through the particle supply pipe 4*a* may be cooled with a cooling device (not shown) if necessary. Alternatively, the carbon black particles supplied into the processing space 2*h* may be cooled in advance by cooling the carrier gas (inert gas) for transporting the carbon black particles.

Now, referring to the flow chart shown in FIG. 10, the following description will explain a manufacturing method, using the manufacturing device 1*a* shown in FIG. 8, of the modified ink particles (modified particles) formed by imparting hydrophobic (water repellent) properties to hydrophilic particles such as the main bodies22 of the ink particles for RGB use in a colour filter.

First, when a paraffin is used as the modifier 21, the temperature of the inner wall portion 2$a_2$ is adjusted to, for example, 400 K with the heating device 7 (S31). Next, in a similar manner as above, carbon black particles having a geometrical mean diameter of about 0.5 $\mu$m and a particle density of $10^{11}$ pieces/$m^3$ and a paraffin which acts as the modifier 21 are introduced respectively through a particle introduction port 20 and through the modifier introduction port 72 into the processing space 2*h* by lowering the pressure varying piston 75*a*, and thereafter the processing space 2*h* is sealed in a similar manner as above (S32).

Next, to obtain saturated, vapourised paraffin, the processing space 2*h* is pressurised as well as heated. The pressurisation is done by lifting the piston 75*a*. In the pressurisation, the pressure in the processing space 2*h* of the modification tower 42 is increased to a predetermined pressure higher than normal pressure, for example, to a pressure equal to atmospheric pressure plus 160 mmHg. The pressure in the processing space 2*h* is specified to the predetermined pressure as it is measured with the pressure meter 60. Here, the paraffin inside the processing space 2*h* is simultaneously heated (S33).

Thereafter, the modification tower 42 is left for a suitable period of time, for example, five minutes until saturated, vapourised paraffin is obtained in the processing space 2*h* (S34). Saturated, vapourised paraffin is obtained in the processing space 2*h* of the modification tower 42 from the above step. In this state, there is saturated, vapourised paraffin surrounding the RGB colour particles. Next, the pressure in the modification tower 42 is rapidly varied, i.e. reduced, to normal pressure in a similar manner as above (S35).

Here, in the processing space 2*h* containing the RGB colour particles, the saturated, vapourised paraffin reaches an oversaturation state, and there occurs a vapour deposition of vapourised paraffin on the surfaces of the RGB colour particles. As a result, a film of paraffin is produced on the surfaces of the RGB colour particles, and modified ink particles that are each constituted by an RGB colour particle as a core and a modified portion as a paraffin layer on the surface thereof are formed.

The produced modified ink particles are removed and collected from the modification tower 42 through the particle exhaust outlet 5 and the particle exhaust pipe 51 (S36), washed in a similar manner to the above, and then dried before use.

Moreover, the colour filter and the colour display device shown in the first embodiment are fabricated in a similar manner as in the first embodiment, using the modified ink particles obtained in this manner, and it was found that the colour filter and the colour display device exhibit similarly excellent properties.

Embodiment 3

Figure 11:
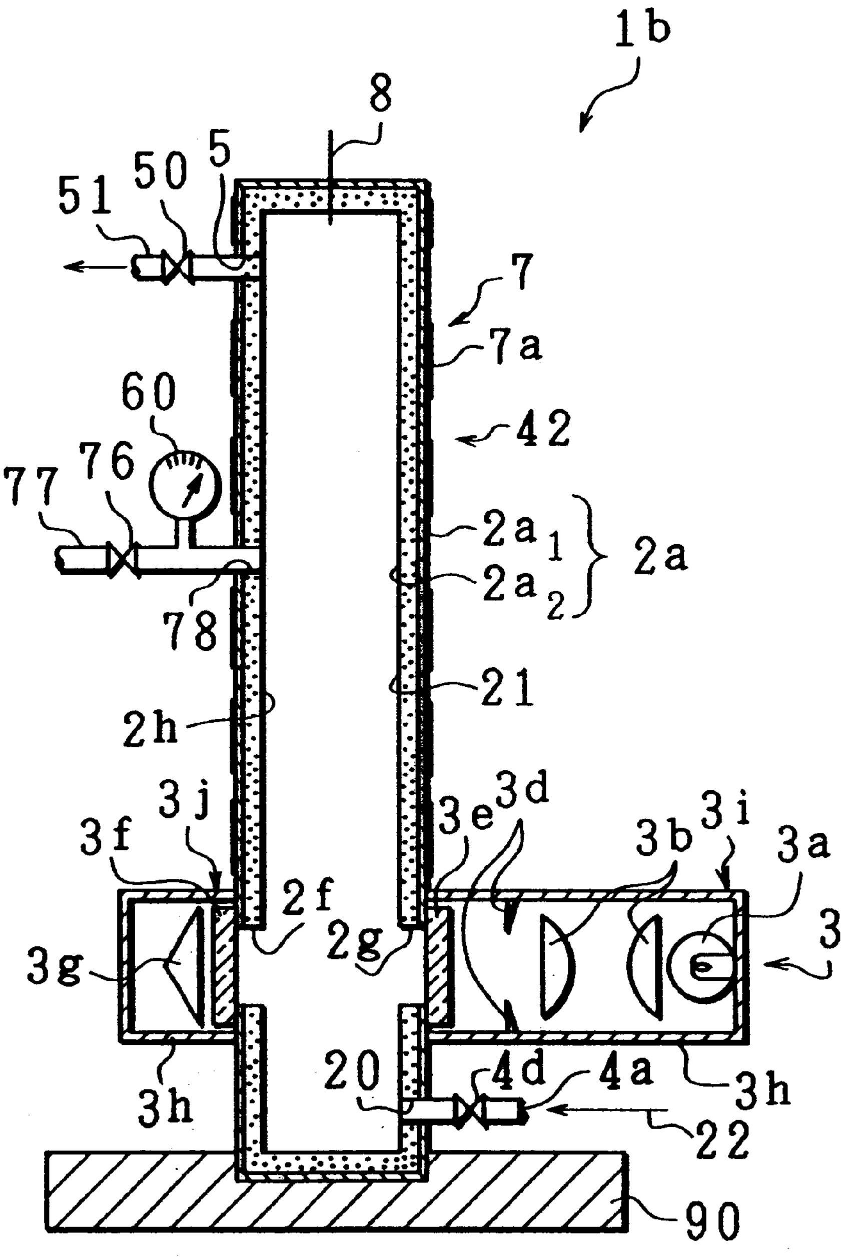
FIG. 11 is a cross-sectional view schematically showing the arrangement of a manufacturing device for modified ink particles of a third embodiment in accordance with the present invention.

The manufacturing device of a modified ink article of the third embodiment in accordance with the present invention is a manufacturing device 1*b* shown in FIG. 11, which is a variation of the manufacturing device 1 detailed in the aforementioned first embodiment. Here, for convenience, members of the manufacturing device 1*b* of the third embodiment that have the same arrangement and function as members of the manufacturing device 1 or 1*a* of the first and second embodiments, and that are mentioned in the first or second embodiment are indicated by the same reference numerals in FIG. 11 and description thereof is omitted.

Figure 13:
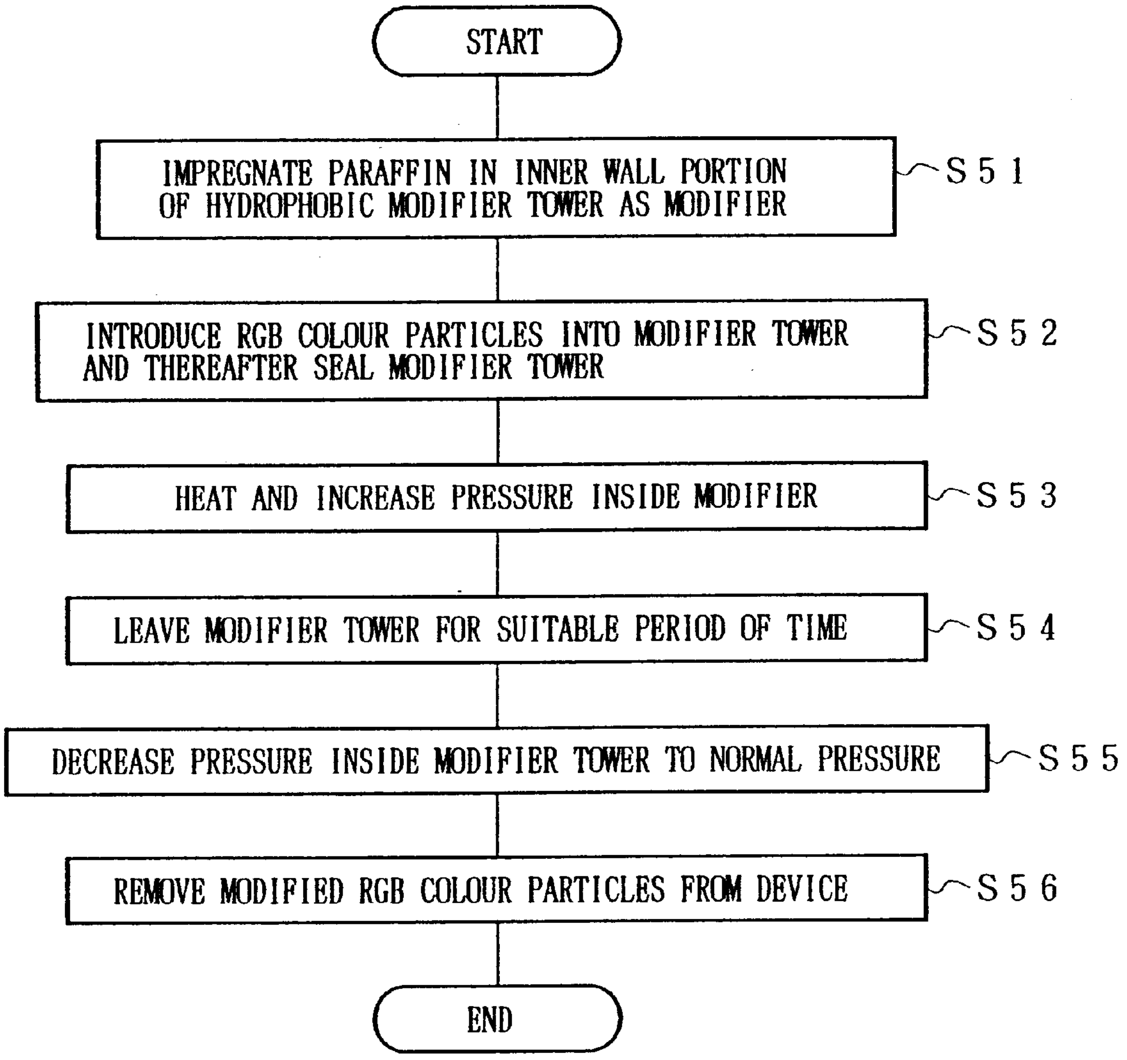
FIG. 13 is a flow chart for another manufacturing method of the modified ink particles of the third embodiment in accordance with the present invention.

Now, referring to the flow charts shown in FIGS. 12 and 13, the following description will explain a manufacturing method of the modified ink particle, using the manufacturing device 1*b*, to explain the arrangements of the manufacturing device 1*b*.

Referring to the flow chart shown in FIG. 12, the manufacturing method of carbon black particles equipped with hydrophilic properties as modified ink particles for a black matrix use will be explained in accordance with the aforementioned manufacturing method. First, nitric acid is impregnated as the modifier 21 in a porous material portion of the inner wall portion 2$a_2$ of the modification tower (modifier tower) 42 in advance (S41).

Next, carbon black particles having a geometrical mean diameter of about 0.5 μm and a particle density of $10^{11}$ pieces/m$^3$ are introduced through a particle introduction port 20 into the processing space 2*h*, and thereafter the processing space 2*h* is sealed (S42). In a case where carbon black particles are introduced in this manner, since the carbon black particles are introduced, for example, as aerosol through the particle introduction port 20 into the processing space 2*h* through the particle introduction pipe 4*a*, the valves 4*d* and 50 of the particle introduction pipe 4*a* and the particle outlet pipe 51 are open to replace air in the processing space 2*h* with the aerosol when the aerosol introduced, and thereafter the processing space 2*h* is turned into a sealed state by closing the valves 4*d* and 50. Meanwhile, the valve 76 for adjusting the pressure inside the processing space 2*h* is in a closed state during this operation.

Next, to obtain saturated, vapourised nitric acid, the processing space 2*h* is pressurised as well as heated with the heating device 7. The pressurisation is done by opening the value 76 of the pressure varying pipe 77 and hence supplying clean air into the processing space 2*h* through the pressure varying pipe 77. The pressure in the processing space 2*h* of the modification tower 42 is increased to a predetermined pressure higher than normal pressure, for example, to a pressure equal to atmospheric pressure plus 160 mmHg. The pressure in the processing space 2*h* is specified to the predetermined pressure as it is measured with the pressure meter 60. Here, the nitric acid inside the processing space 2*h* is simultaneously heated to a temperature of, for example, 400 K (S33).

The heating is done using the heating device 7. As the heating device 7 starts running, the heat generated by the heater 7*a* is given to, and thus heats up, the outer wall portion 2$a_1$, the inner wall portion 2$a_2$, and the processing space 2*h*. The temperature inside the processing space 2*h* is measured with the thermometer 8, and the operation of the aforementioned heating device 7 is controlled according to the measured values.

Thereafter, the modification tower 42 is left for a suitable period of time, for example, five minutes until saturated, vapourised nitric acid is obtained in the processing space 2*h* (S44). Those operations above are controlled by control means (not shown) such as a microcomputer according to detected values of temperature, particle diameters, density, pressure, etc.

Saturated, vapourised nitric acid is obtained in the processing space 2*h* of the modification tower 42 from the above step. In this state, there is saturated, vapourised nitric acid surrounding the carbon black particles. Next, the pressure in the modification tower 42 is rapidly varied, i.e. reduced, to normal pressure (S45). Hence, the saturated, vapourised nitric acid expands adiabatically and reaches an oversaturation state. To reduce the pressure in this manner, the valve 76 of the pressure varying pipe 77 is opened so that the processing space 2*h* is open to air.

Here, in the processing space 2*h* containing the carbon black particles, the saturated, vapourised nitric acid reaches an oversaturation state, and there occurs a vapour deposition of vapourised nitric acid on the surfaces of the carbon black particles. As a result, a liquid film is produced on the surfaces of the carbon black particles, and the modified ink particles modified in the aforementioned manner are formed. The particle diameters and the particle density of the aforementioned modified ink particles are measured with the optical measurement device 3. Furthermore, in the aforementioned optical measurement device 3, a focusing section 3*d* is provided for focusing the optical path between the lens 3*b* and the translucent plate 3*e* in the light emitting section 3*i*.

The produced modified ink particles are removed and collected from the modification tower 42 through the particle exhaust outlet 5 and the particle exhaust pipe 51 (S46), washed in a similar manner to the above, and then dried before use. The collection is done by sending clean air through the particle introduction port 20, with the valve 76 of the pressure varying port 78 being closed and the valves 4*d* and 50 of the particle introduction port 20 and the particle outlet pipe 51 being opened.

Now, referring to the flow chart shown in FIG. 13, the following description will explain a manufacturing method, using the manufacturing device 1*b* shown in FIG. 11, of the modified ink particles (modified particles) formed by imparting hydrophobic (water repellent) properties to hydrophilic particles such as the main bodies22 of the ink particles for RGB use in a colour filter.

First, olefin, paraffin, or another substance is impregnated as the modifier 21 in a porous material portion of the inner wall portion 2*$a_2$* of the modification tower (modifier tower) 42 in advance (S51). Next, RGB colour particles having a geometrical mean diameter of about 0.5 $\mu$m and a particle density of $10^{11}$ pieces/$m^3$ are introduced through a particle introduction port 20 into the processing space 2*h*, and thereafter the processing space 2*h* is sealed (S52).

Next, to obtain the saturated, vapourised modifier 21, the processing space 2*h* is pressurised up to pressure of, for example, to a pressure equal to atmospheric pressure plus 160 mmHg, as well as heated with the heating device 7 so that the temperature of the inner wall portion 2*$a_2$* reaches, for example, 420 K (S53).

Thereafter, the modification tower 42 is left for a suitable period of time, for example, five minutes until the saturated, vapourised modifier 21 is obtained in the processing space 2*h* (S54). The saturated, vapourised modifier 21 is obtained in the processing space 2*h* of the modification tower 42 from the above step.

Thereafter, the pressure in the modification tower 42 is rapidly varied, i.e. reduced, to normal pressure (S55). Hence, the saturated, vapourised modifier 21 expands adiabatically and reaches an oversaturation state, and therefore in the processing space 2*h* containing the RGB colour particles a film of the modifier 21 is produced on the surfaces of the RGB colour particles, and the modified ink particles modified in the aforementioned manner are formed. The particle diameters and the particle density of the aforementioned modified ink particles are measured with the optical measurement device 3.

The produced modified ink particles are removed and collected from the modification tower 42 through the particle exhaust outlet 5 and the particle exhaust pipe 51 (S56), washed in a similar manner to the above, and then dried before use.

Moreover, the colour filter and the colour display device shown in the first embodiment are fabricated in a similar manner as in the first embodiment, using the modified ink particles obtained in this manner, and it was found that the colour filter and the colour display device exhibit similarly excellent properties.

Embodiment 4

Figure 14:
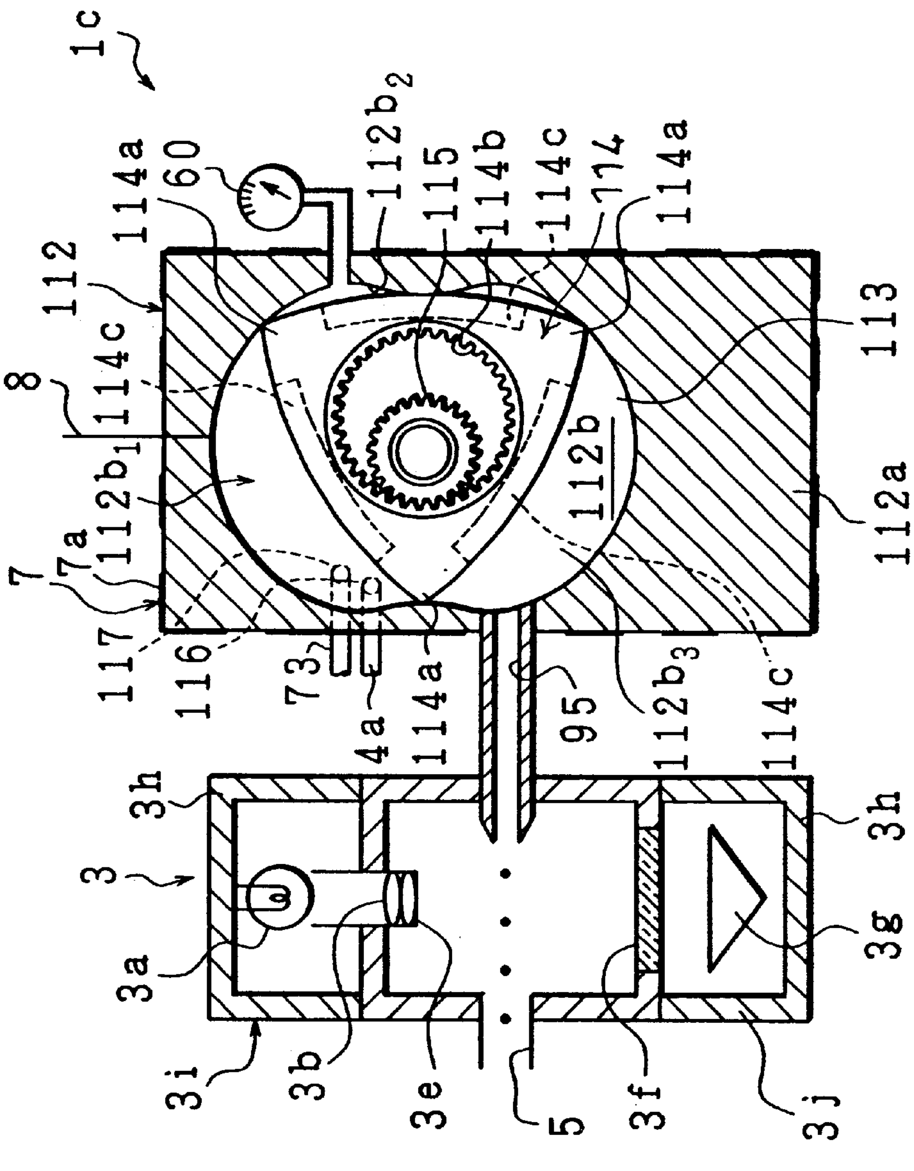
FIG. 14 is a cross-sectional view schematically showing the arrangement of a manufacturing device for modified ink particles of a fourth embodiment in accordance with the present invention.

The manufacturing device of a modified ink particle of the fourth embodiment in accordance with the present invention is a manufacturing device 1*c* shown in FIG. 14, which is a variation of the manufacturing device 1 detailed in the aforementioned first embodiment. Here, for convenience, members of the manufacturing device 1*c* of the fourth embodiment that have the same arrangement and function as members of the manufacturing device 1, 1*a*, or 1*b* of the first to third embodiments, and that are mentioned in the first, second, or third embodiment are indicated by the same reference numerals in FIG. 14 and description thereof is omitted.

The manufacturing device 1*c* includes a vapour deposition section (pressure adjusting means) 112 instead of the aforementioned vapour deposition box 2 detailed in the first embodiment. The vapour deposition section 112, being a rotary-typed petrol engine, alternately compresses and expands the gas adiabatically in the internal space.

In other words, the vapour deposition section 112 is provided with a substantially polygonal column-shaped rotating rotor 114, and an inner wall portion 113 that touches ridge line ends 114*a* of the rotor 114, so that the volumes of the processing spaces 112*b* formed between the outer surfaces 114*c* of the rotor 114 between adjacent ridge line ends 114*a* and the inner wall portion 113 opposing those outer surfaces 114*c* change among the processing spaces 112*$b_1$*, 112*$b_2$*, and 112*$b_3$* according to the rotation of the rotor 114.

The inner wall portion 113 has a figure-eight-like shape, or a shape of partially overlapping two circles, in the cross-section in a direction perpendicular to the rotation axis of the rotor 114. The rotor 114 is provided therein with an internally cogged gear 114*b* and an externally cogged drive gear 115; the drive gear 115 has a smaller diameter than the gear 114*b* and internally engages with the gear 114*b* so as to rotate freely. Hence, the rotor 114 can rotate in the inner wall portion 113 while keeping the ridge line ends 114*a* in contact with the inner wall portion 113.

Here, one of the outer surfaces 114*c* of the rotor 114 may come in contact with the convex portion of the inner wall portion 113. However, the concave portion provided to the middle portion of the outer surface 114*c* prevents the processing spaces 112*b* formed between adjacent ridge line ends 114*a*, for example, the processing space 112*$b_2$* from being divided by the convex portion between the adjacent ridge line ends 114*a*.

Figure 15:
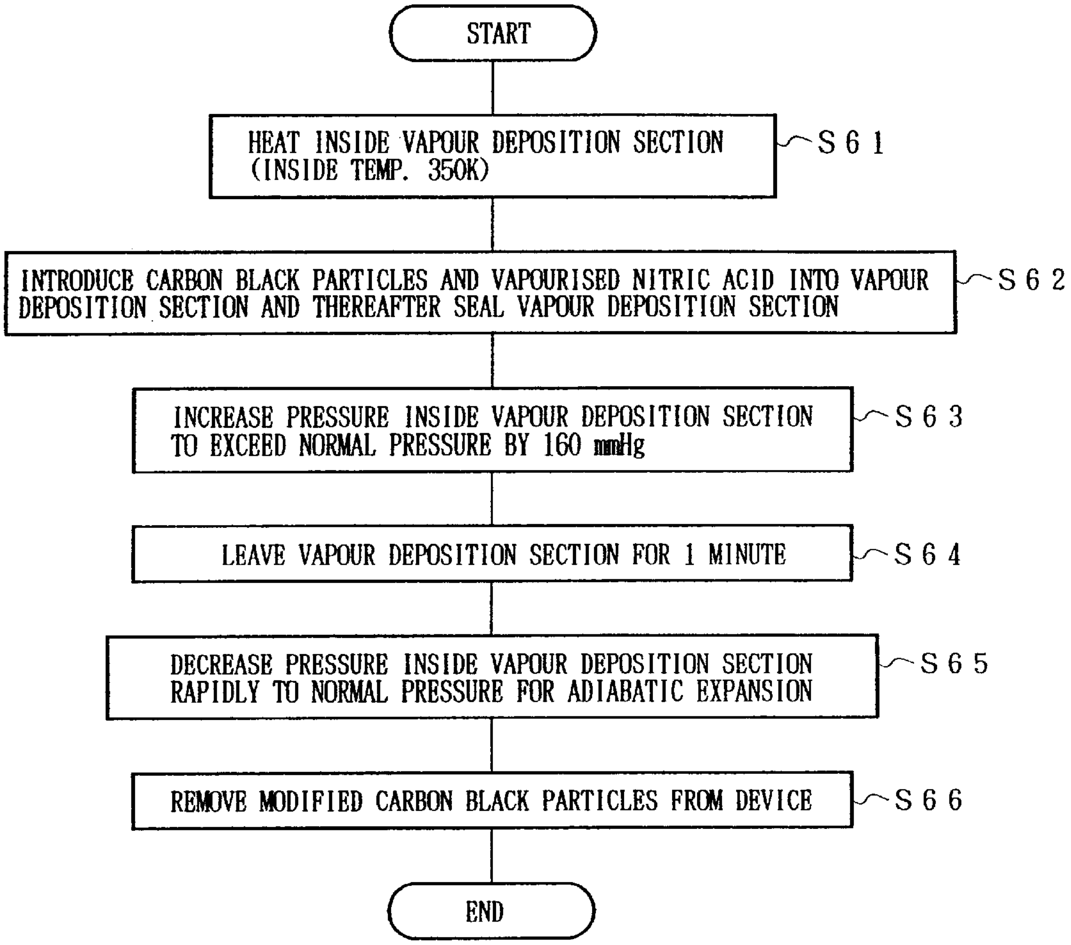
FIG. 15 is a flow chart for a manufacturing method of the modified ink particles of the fourth embodiment in accordance with the present invention.
Figure 16:
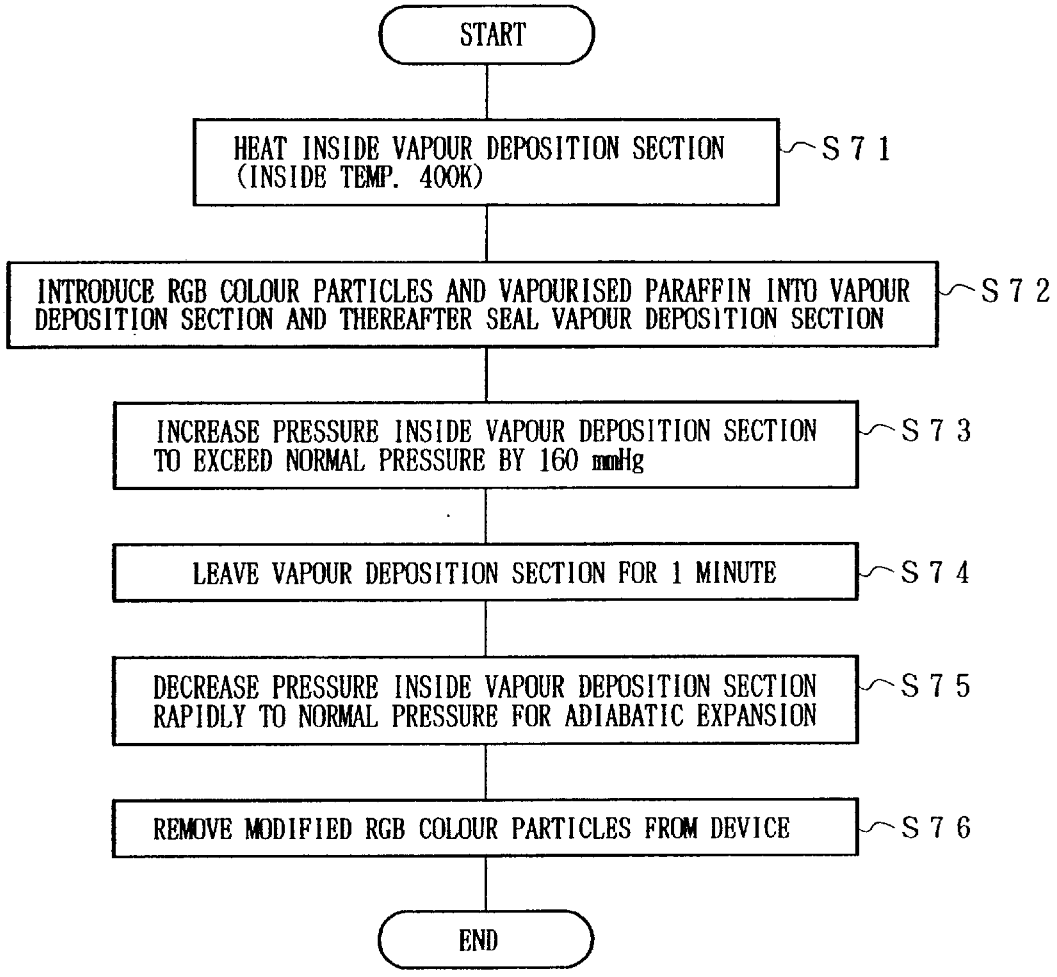
FIG. 16 is a flow chart for another manufacturing method of the modified ink particles of the fourth embodiment in accordance with the present invention.

Now, referring to the flow charts shown in FIGS. 15 and 16 as well as to FIG. 14, the following description will explain a manufacturing method, using the aforementioned manufacturing device 1*c*, of the modified ink particles.

First, the temperature of the wall portion 112*a* of the vapour deposition section 112 is heated to 350 K with the heating device 7 (S61). Subsequently, the rotor 114 is set to the position shown in FIG. 14, and the vapourised nitric acid produced in vapour producing section (not shown) of the modifier 21 is supplied via a vapour supply pipe 73 to the processing space 112*b*. Meanwhile, carbon black particles having a geometrical mean diameter of about 0.5 $\mu$m and a particle density of $10^{11}$ pieces/$m^3$ are introduced through a particle supply pipe 4*a* to the processing space 112*b*. In such a case, the apertures 117 and 116 of the vapour supply pipe 73 and the particle introduction pipe 4*a* are open to the aforementioned processing space 112*b* (processing space 112*$b_1$*).

Subsequently, the aforementioned rotor 114 rotates in the direction denoted by the arrow in FIG. 14 (clockwise) under the control by control means (not shown) such as a microcomputer. As one of the ridge line ends 114*a* that was located in an anti-clockwise direction and was a part of the aforementioned processing space 112*b* passes in front of the apertures 117 and 116, the aforementioned processing space 112*b* is cut off from the vapour supply pipe 73 and the particle introduction pipe 4*a*. Therefore, the aforementioned processing space 112*b*, as moving clockwise in the vapour deposition section 112, reaches a closed state (S62).

Next, to obtain saturated, vapourised nitric acid in the aforementioned vapour deposition section 112, the aforementioned processing space 112*b* is heated as well as pressurised. The pressurisation is done by a clockwise further rotation of the rotor 114 (180° from the state shown in FIG. 14). In the pressurisation, the pressure of the aforementioned processing space 112*b* (processing space 112$b_2$) is increased to a predetermined pressure that is higher than normal pressure (atmospheric pressure), for example, to atmospheric pressure plus 160 mmHg. The pressure in the processing space 112*b* (a state of the processing space 112$b_2$) is measured with the pressure meter 60 and specified to the predetermined pressure by a pressure adjusting device (not shown) according to measured values.

The heating is done using the heating device 7. As the heating device 7 starts running, the heat generated by the heater 7*a* heats up, the inside of the processing spaces 112*b* via the wall portion 112*a* and the inner wall portion 113. The temperature inside the processing spaces 112*b* is measured with the thermometer 8, and the operation of the aforementioned heating device 7 is controlled according to the measured values (S63).

Thereafter, while keeping the vapourised nitric acid in a pressurised state, the rotor 114 is left for a suitable period of time, for example, one minute until saturated, vapourised nitric acid is obtained (S64). In other words, the aforementioned state is preserved for the vapour deposition section 112. To obtain saturated vapour, the aforementioned pressurisation is essential, while the heating is done only if necessary to supplement the effects of the pressurisation. This is applicable to the embodiments detailed below. Saturated, vapourised modifier is obtained in the processing space 112*b* (processing space 112$b_2$) from the above step. In this state, there is vapourised modifier surrounding the carbon black particles.

Next the rotor 114 further rotates and adiabatically reduces the pressure inside the processing space 112*b* to normal pressure (S65) so that the saturated, vapourised nitric acid reaches an oversaturation state. Hence, in the processing space 112*b* containing the carbon black particles, the saturated, vapourised modifier reaches an oversaturation state, causing vapour deposition and reactions of the vapourised nitric acid on the surfaces of the carbon black particles. As a result, a liquid film of nitric acid is produced on the surfaces of the carbon black particles, and the modified ink particles are formed in the aforementioned manner.

The obtained modified ink particles are collected via the optical measurement device 3 and the particle exhaust outlet 5 by further rotating the rotor 114 and opening the processing space 112*b* (processing space 112$b_3$) to the particle exhaust outlet 95 of the vapour deposition section 112 (S66), washed in a similar manner to the above, and then dried before use.

Note that although vapourised nitric acid was introduced through the vapour introduction pipe 73 as an example in the aforementioned description, saturated vapour may be generated in the processing space 112*b*, using the heating device 7, by arranging at least a part of the concave portion provided to the middle portion of outer surface 114*c* of the rotor 114, facing the processing space 112*b*, from a porous material, adhering and impregnating the modifier into the porous material in advance.

Now, referring to the flow chart shown in FIG. 16, the following description will explain a manufacturing method, using the manufacturing device 1*c* shown in FIG. 14, of the modified ink particles (modified particles) formed by imparting hydrophobic (water repellent) properties to hydrophilic particles such as the main bodies22 of the ink particles for RGB use in a colour filter.

First, olefin, paraffin, or other substances is used as the modifier 21. The wall portion 112*a* of the vapour deposition section 112 is heated with a heating device 7 to a temperature of 400 K (S71).

Subsequently, the rotor 114 is set to the position shown in FIG. 14, and vapourised paraffin or other substances produced from the modifier 21 in the vapour producing section (not shown) is supplied to the processing space 112*b* via the vapour supply pipe 73. Meanwhile, RGB colour particles having a geometrical mean diameter of about 0.5 $\mu$m and a particle density of $10^{11}$ pieces/$m^3$ are introduced through a particle supply pipe 4*a* to the processing space 112*b*.

Thereafter, the aforementioned rotor 114 is rotated in the direction denoted by the arrow (clockwise) in the FIG. 14, and the aforementioned processing space 112*b*, as moving clockwise in the vapour deposition section 112, reaches a closed state (S72).

Next, to obtain saturated, vapourised paraffin or other substances in the aforementioned vapour deposition section 112, the aforementioned processing space 112*b* is heated as well as pressurised. The pressurisation is done by a clockwise further rotation of the rotor 114 (180° from the state shown in FIG. 14). In the pressurisation, the pressure of the aforementioned processing space 112*b* (processing space 112$b_2$) is increased to a predetermined pressure that is higher than normal pressure (atmospheric pressure), for example, to atmospheric pressure plus 160 mmHg. The heating is done using the heating device 7 (S73).

Thereafter, while keeping the vapour in a pressurised state, the rotor 114 is left for a suitable period of time, for example, one minute until saturated, vapourised paraffin or other substances is obtained. In other words, the aforementioned state is preserved for the vapour deposition section 112 to obtain saturated vapour (S74).

Saturated, vapourised modifier is obtained in the processing space 112*b* (processing space 112$b_2$) from the above step. In this state, there is vapourised paraffin or other substances surrounding the RGB colour particles. Next the rotor 114 further rotates and adiabatically reduces the pressure inside the processing space 112*b* to normal pressure so that the saturated, vapourised paraffin or other substances reach an oversaturation state (S75). Hence, in the processing space 112*b* containing the RGB colour particles, the saturated, vapourised modifier reaches an oversaturation state, causing vapour deposition of the vapourised paraffin or other substances on the surfaces of the RGB colour particles. As a result, a film of paraffin and other substances is produced on the surfaces of the RGB colour particles, and the modified ink particles are formed in the aforementioned manner.

The obtained modified ink particles are collected via the optical measurement device 3 and the particle exhaust outlet 5 by further rotating the rotor 114 and opening the processing space 112*b* (processing space 112$b_3$) to the particle exhaust outlet 95 of the vapour deposition section 112 (S76), washed in a similar manner to the above, and then dried before use.

Moreover, the colour filter and the colour display device shown in the first embodiment are fabricated in a similar manner as in the first embodiment, using the modified ink particles obtained in this manner, and it was found that the colour filter and the colour display device exhibit similarly excellent properties.

Embodiment 5

Figure 17:
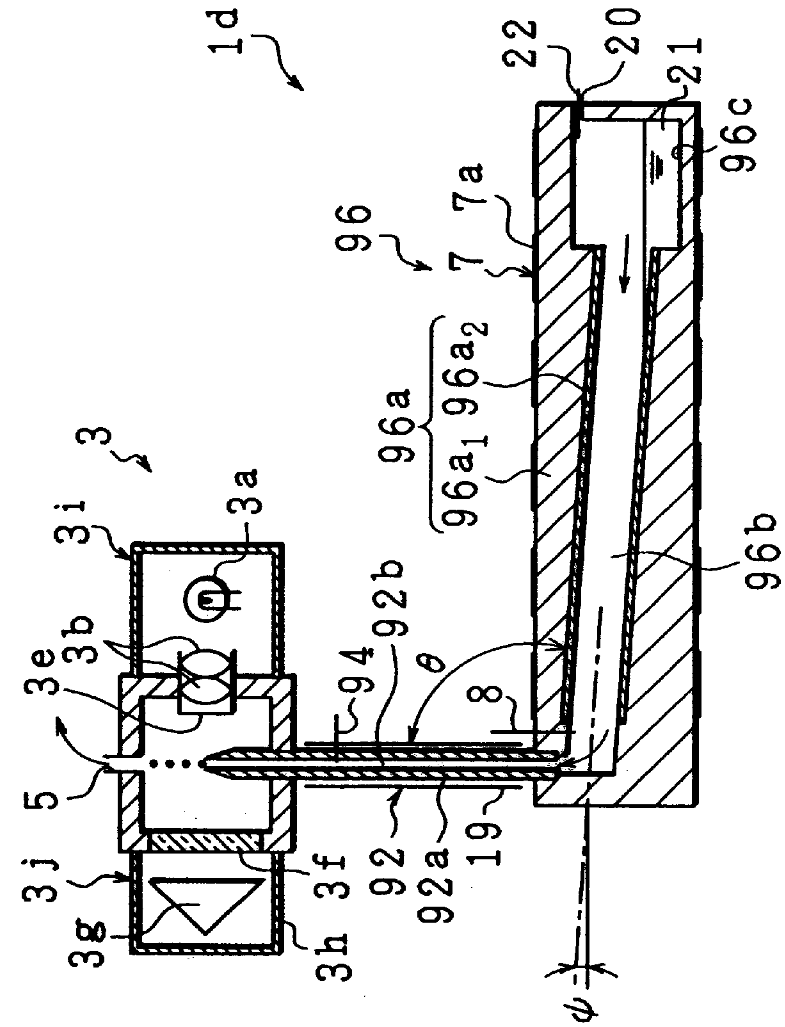
FIG. 17 is a cross-sectional view schematically showing the arrangement of a manufacturing device for modified ink particles of a fifth embodiment in accordance with the present invention.

The manufacturing device of a modified ink particle of the fifth embodiment in accordance with the present invention is a manufacturing device 1*d* shown in FIG. 17, which is a variation of the manufacturing device 1 detailed in the aforementioned first embodiment. Here, for convenience, members of the manufacturing device 1*d* of the fifth embodiment that have the same arrangement and function as members of the manufacturing device 1, 1*a*, 1*b*, or 1*c* of the first to fourth embodiments, and that are mentioned in the first, second, third, or fourth embodiment are indicated by the same reference numerals in FIG. 17 and description thereof is omitted.

In the manufacturing device 1*d*, a particle introduction port 20 for supplying the main bodies22 of the ink particles together with cleaned inert gas is provided so as to open above the end portion of the vapour generating space 96*b* of the vapour producing section 96 close to the storage section 96*c*.

The outer wall portion 96*a*$_1$ and the inner wall portion 96*a*$_2$ of the wall portion 96*a* of the vapour producing section 96 are equivalent to the aforementioned outer wall portion 2*a*$_1$ and the inner wall portion 2*a*$_2$. Moreover, the vapour generating space 96*b* is for producing the vapourised modifier 21 and mixing the vapourised modifier 21 with the main bodies22 of the ink particles.

The central axis of the cylindrically shaped vapour generating space 96*b* in the vapour producing section 96 inclines vertically to the horizontal direction. The inclination angle ψ is specified in a range larger than 0° up to 90°.

The manufacturing device 1*d* is provided therein with a cooling pipe 92 as a cooling pipe so that the angle θ between the central axis of the cooling pipe 92 and the central axis of the cylindrically shaped vapour generating space 96*b* in the vapour producing section 96 is in a range of 90°, i.e. vertical, to 1°. In other words, the cooling pipe 92 is disposed to the upper portion of the vapour producing section 96 and extends upwards therefrom.

Meanwhile, the cooling pipe 92 is provided on the outer circumference section thereof with a cooling device 19 that is similar to the aforementioned cooling device 13 for cooling the inside of the internal transport path 92*b*. The inner surface of the pipe wall portion 92*a* of the cooling pipe 92 is at least partially constituted by a water repellent material such as fluoride resin that repels water solutions that contain water.

Hence, even if vapour in the aforementioned cooling pipe 92 condenses and thus liquidates on the pipe wall portion 92*a* of the cooling pipe 92, since the liquidated vapour circulates back to the vapour producing section 96 via the aforementioned pipe wall portion 92*a*, the modifier 21 can be used efficiently.

The heating device 7 disposed on the outer circumference of the vapour producing section 96, as well as the cooling device 19 of the cooling pipe 92, is controlled by adjusting means (not shown) such as a programmable microcomputer that precisely controls the temperature with a temperature adjusting device according to the measurement results by the thermometers 8 and 94 respectively disposed to the vapour producing section 96 and the cooling pipe 92 so that the temperature in the vapour producing section 96 and that of the transport path 92*b* in the cooling pipe 92 become equal to a predetermined temperature.

Modified ink particles are obtained that are similar to those mentioned earlier, by operating and manipulating the manufacturing device 1*d* in the same manner as the manufacturing device 1, 1*a*, 1*b*, and 1*c* except those operations shown below that are different from the aforementioned cases.

The following description will discuss those different operations. First, since the main bodies22 of the ink particles are supplied through the particle introduction port 20 into the vapour producing section 96, a longer contact time is assured between the main bodies22 of the ink particles and the vapour that is in an oversaturated state. Accordingly, the main bodies22 of the ink particles and the vapour that is in a oversaturation state can be supplied continuously into the cooling pipe 92 in a well mixed state, i.e. in a more uniformly mixed state. Subsequently, by cooling the transport path 92*b* in the cooling pipe 92 with the cooling device 19, the vapour reaches an oversaturation state, and the modifier 21 is vapour-deposited on the surfaces of the main bodies22 of the ink particles.

Therefore, similarly to, for example, the aforementioned manufacturing device 1, the manufacturing device id can not only vapour-deposit the modifier 21 on the surfaces of the main bodies22 of the ink particles, but conduct the deposition of the vapourised modifier 21 on the surfaces of the main bodies22 of the ink particles in a more uniform manner, allowing the modified ink particles to be manufactured at lower costs.

Figure 18:
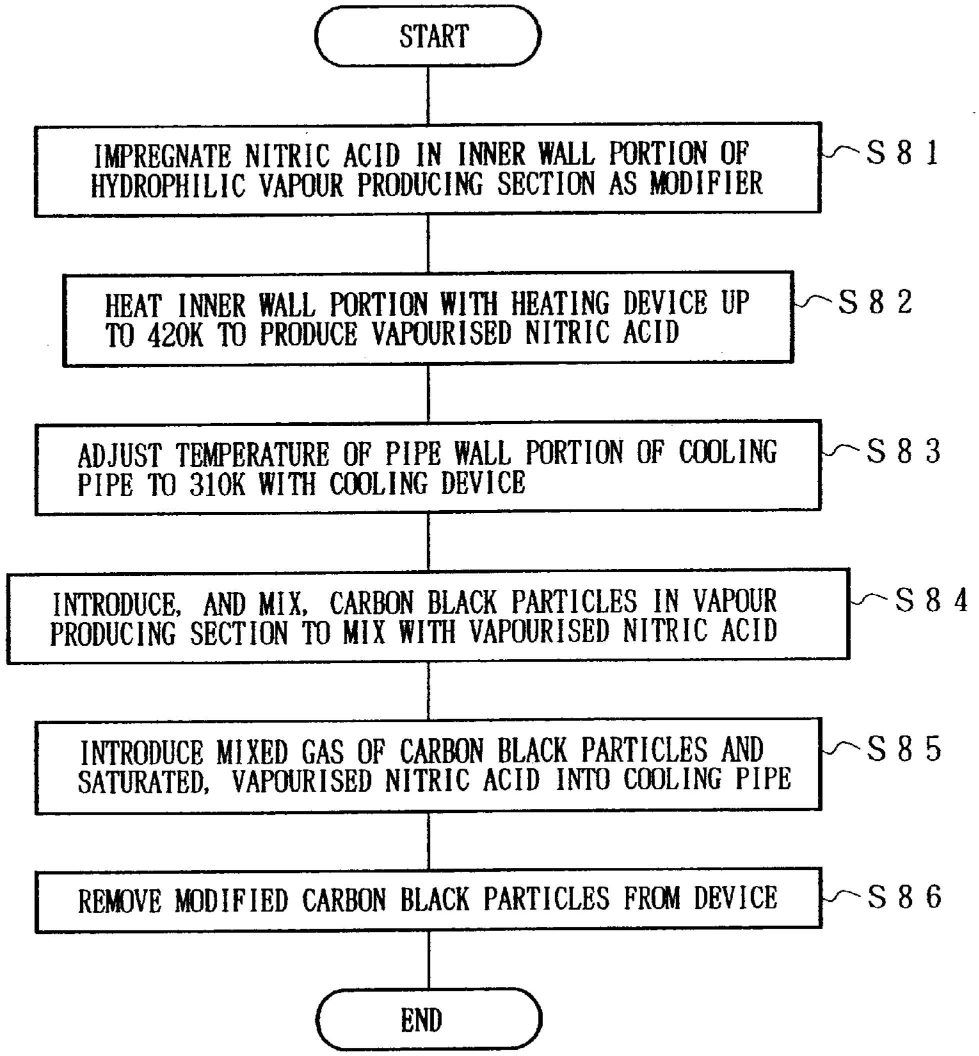
FIG. 18 is a flow chart for a manufacturing method of the modified ink particles of the fifth embodiment in accordance with the present invention.
Figure 19:
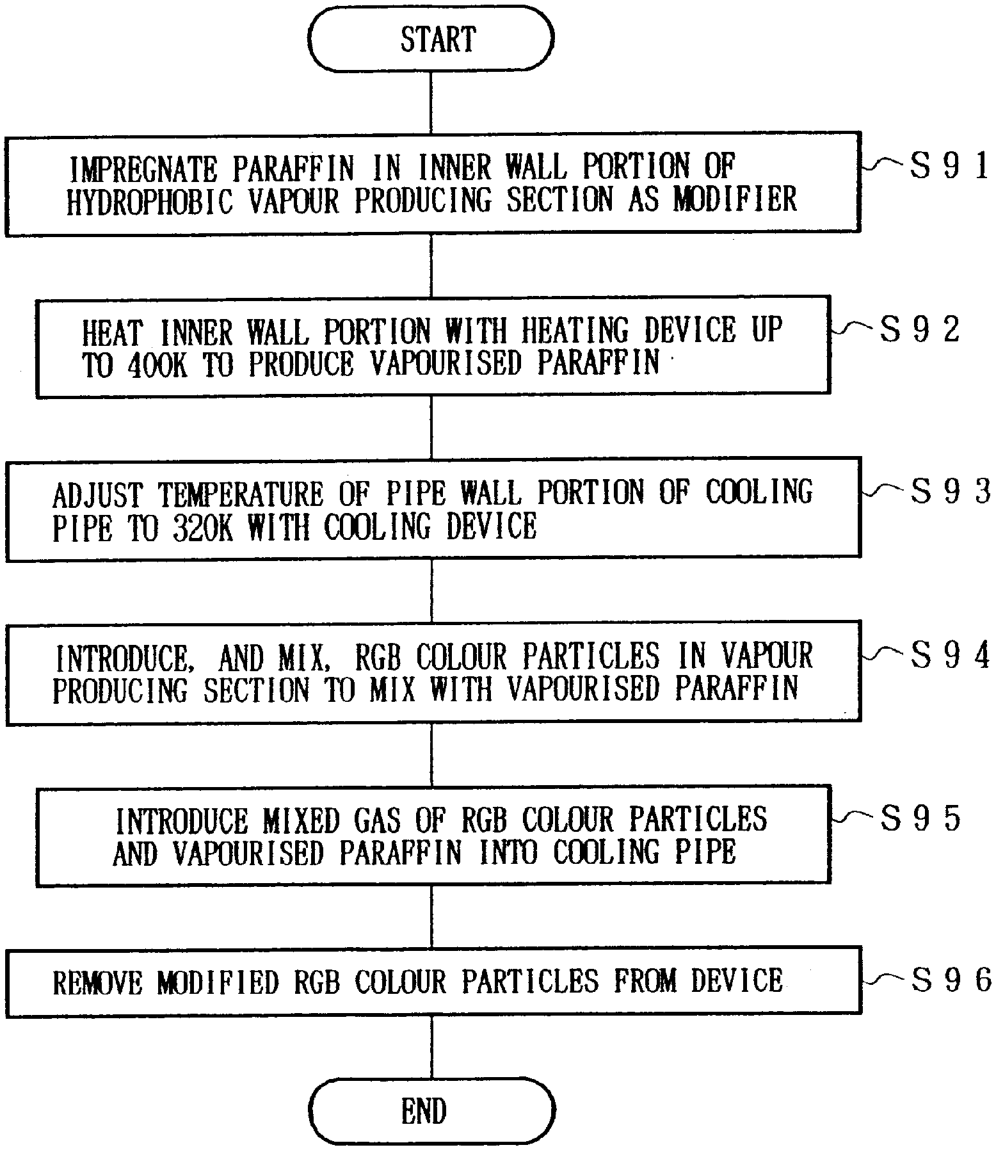
FIG. 19 is a flow chart for another manufacturing method of the modified ink particles of the fifth embodiment in accordance with the present invention.

Now, referring to the flow charts shown in FIGS. 18 and 19, the following description will explain a manufacturing method, using the manufacturing device 1*d*, of the modified ink particles.

First, referring to the flow chart shown in FIG. 18, the following description will explain a manufacturing method of the carbon black particles formed by imparting hydrophilic properties for black matrix as modified ink particles in accordance with the manufacturing method above. First, nitric acid is impregnated as the modifier 21 to the porous material portion of the inner wall portion 96*a*$_2$ of the vapour producing section 96 in advance (S81).

Subsequently, the inner wall portion 96*a*$_2$ is heated to a temperature of 420 K with a heating device 7 (S82). Hence, saturated, vapourised nitric acid is produced in the vapour generating space 96*b*. Meanwhile, the cooling pipe 92 is cooled with the cooling device 19 so that the temperature of the pipe wall portion 92*a* of the cooling pipe 92 becomes equal to 310 K (S83).

Next, carbon black particles having a geometrical mean diameter of about 0.5 $\mu$m and a particle density of $10^{12}$ pieces/m$^3$ are introduced as, for example, an aerosol through the particle introduction port 20 into the vapour generating space 96*b* of the vapour producing section 96. Hence, in the vapour generating space 96*b*, a mixture gas of the carbon black particles, and saturated, vapourised nitric acid is obtained (S84).

Thereafter, the mixture gas is introduced into the cooling pipe 92 and cooled therein (S85). Hence, the saturated, vapourised nitric acid reaches an oversaturation state, there occurs vapour deposition of the vapourised nitric acid on the surfaces of the carbon black particles, and a liquid film of nitric acid is produced on the surfaces of the carbon black particles. As a result of this, the modified ink particles modified in the aforementioned manner are formed. The particle diameters and the particle density of the aforementioned modified ink particles are measured with an optical measurement device 3. The produced modified ink particles are removed through the particle exhaust outlet 5 (S86), washed in a similar manner to that mentioned earlier, and then dried before use.

Now, referring to the flow chart shown in FIG. 19, the following description will explain a manufacturing method, using the manufacturing device 1*d* shown in FIG. 17, of the modified ink particles (modified particles) formed by imparting hydrophobic (water repellent) properties to hydrophilic particles such as the main bodies22 of the ink particles for the RGB use in a colour filter.

First, olefin, paraffin, or other substance is impregnated as the modifier 21 to the porous material portion of the inner wall portion 96$a_2$ of the vapour producing section 96 in advance (S91). Subsequently, the inner wall portion 96$a_2$ is heated to a temperature of 400 K with a heating device 7 (S92). Hence, saturated, vapourised paraffin or other substances is produced in the vapour generating space 96*b*. Meanwhile, the cooling pipe 92 is cooled with the cooling device 19 so that the temperature of the pipe wall portion 92*a* of the cooling pipe 92 becomes equal to 320 K (S93).

In such a case, at least a part of the inner surface of the pipe wall portion 92*a* of the cooling pipe 92 is formed from a material that repels oil soluble liquids. This allows the modifier 21, when condensed in the cooling pipe 92, to flow on the inner surface of the pipe wall portion 92*a* back to the vapour producing section 96, thereby enabling efficient use of the modifier 21.

Next, RGB colour particles having a geometrical mean diameter of about 0.5 $\mu$m and a particle density of $10^{12}$ pieces/$m^3$ are introduced as, for example, an aerosol through the particle introduction port 20 into the vapour generating space 96*b*. Hence, in the vapour generating space 96*b*, a mixture gas of the RGB colour particles and the saturated, vapourised paraffin or other substances is obtained (S94).

Thereafter, the aforementioned mixture gas is introduced into the cooling pipe 92 and cooled therein (S95). Hence, the saturated, vapourised paraffin or other substances reaches an oversaturation state, there occurs vapour deposition of the vapourised paraffin or other substances on the surfaces of the RGB colour particles, and a film of paraffin or other substances is produced on the surfaces of the RGB colour particles. Hence the modified ink particles modified in the aforementioned manner are formed. The particle diameters and the particle density of the aforementioned modified ink particles are measured with an optical measurement device 3.

The produced modified ink particles are removed through the particle exhaust outlet 5 (S96), washed in a similar manner to that mentioned earlier, and then dried before use.

Moreover, the colour filter and the colour display device shown in the first embodiment are fabricated in a similar manner as in the first embodiment, using the modified ink particles obtained in this manner, and it was found that the colour filter and the colour display device exhibit similarly excellent properties.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A color filter, comprising:

a water repellent resin layer formed on a plastic substrate; and a coloring section formed from a modified ink particle on the water repellent resin layer, wherein the modified ink particle includes: a main body; and a modified portion formed from a modifier on at least a part of a surface of the main body by vapor-depositing the vaporised modifier on the surface of the main body that is floating with an inert gas acting as a carrier for the main body wherein the modifier has a boiling point in the range of 20 to 300° C.

2. The colour filter as set forth in claim 1, wherein the colouring section includes a black matrix layer, a colour filter layer, or both.

3. A color filter, comprising:

a hydrophilic resin layer formed on a glass substrate; and a coloring section formed from a modified ink particle on the hydrophilic resin layer, wherein the modified ink particle includes: a main body; and a modified portion formed from a modifier on at least a part of a surface of the main body by vapor-depositing the vaporised modifier on the surface of the main body that is floating with an inert gas acting as a carrier for the main body wherein the modifier has a boiling point in the range of 20 to 300° C.

4. The colour filter as set forth in claim 3, wherein the colouring section includes a black matrix layer, a colour filter layer, or both.

5. A color display device having a color filter, the color filter including: a water repellent resin layer formed on a plastic substrate; and a color filter layer formed from a modified ink particle on the water repellent resin layer, the modified ink particle comprising:

a main body; and a modified portion formed from a modifier on at least a part of a surface of the main body by vapor-depositing the vaporised modifier on the surface of the main body that is floating with an inert gas acting as a carrier for the main body wherein the modifier has a boiling point in the range of 20 to 300° C.

6. A color display device having a color filter, the color filter including: a hydrophilic resin layer formed on a glass substrate; and a coloring filter layer formed from a modified ink particle on the hydrophilic resin layer, the modified ink particle comprising:

a main body; and a modified portion formed from a modifier on at least a part of a surface of the main body by vapor-depositing the vaporised modifier on the surface of the main body that is floating with an inert gas acting as a carrier for the main body wherein the modifier has a boiling point in the range of 20 to 300° C.

* * * * *